(12) United States Patent
Oka

(10) Patent No.: US 6,403,966 B1
(45) Date of Patent: Jun. 11, 2002

(54) MEASUREMENT METHOD AND APPARATUS

(75) Inventor: Michio Oka, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/339,851

(22) Filed: Jun. 25, 1999

(30) Foreign Application Priority Data

Jul. 2, 1998 (JP) .......................................... 10-187774

(51) Int. Cl.[7] .................................................. G01J 1/42
(52) U.S. Cl. ........................................ 250/372; 250/373
(58) Field of Search ................................ 250/372, 373

(56) References Cited

U.S. PATENT DOCUMENTS

| | | | | |
|---|---|---|---|---|
| 1,954,755 A | * | 4/1934 | Heine .......................... 359/661 |
| 4,039,370 A | * | 8/1977 | Kleinknecht .................. 438/16 |
| 4,367,044 A | * | 1/1983 | Booth, Jr. et al. ........... 356/504 |
| 4,385,812 A | * | 5/1983 | Wille et al. .................. 359/511 |
| 4,827,480 A | * | 5/1989 | Kowalski ...................... 372/28 |
| 4,834,111 A | * | 5/1989 | Khanna et al. ............... 600/587 |
| 4,879,723 A | * | 11/1989 | Dixon et al. ................... 372/21 |
| 5,027,361 A | * | 6/1991 | Kozlovsky et al. ............ 372/22 |
| 5,159,408 A | * | 10/1992 | Waldenmaier et al. ...... 356/485 |
| 5,345,306 A | * | 9/1994 | Ichimura et al. ............. 356/451 |
| 5,371,588 A | * | 12/1994 | Davis et al. .................. 356/489 |
| 5,523,839 A | * | 6/1996 | Robinson et al. ............ 356/489 |
| 5,689,335 A | * | 11/1997 | Strauss ......................... 356/484 |
| 5,717,518 A | * | 2/1998 | Shafer et al. ................ 359/357 |
| 5,801,876 A | * | 9/1998 | Kouta ........................... 359/326 |
| 5,982,788 A | * | 11/1999 | Hemmati ...................... 372/21 |
| 6,150,666 A | * | 11/2000 | Engelhardt et al. .... 250/559.22 |

* cited by examiner

Primary Examiner—Constantine Hannaher
Assistant Examiner—Shun Lee
(74) Attorney, Agent, or Firm—Sonnenschein, Nath & Rosenthal

(57) ABSTRACT

A measurement method and a measurement apparatus for measuring the structure of a micro-structure or the structure along the depth of an object for measurement. The laser light from a solid-state laser light source is subjected to wavelength conversion to generate the ultraviolet laser light, and measurement is made of the object for measurement by heterodyne detection or homodyne detection employing the ultraviolet laser light. This enables measurement of a structure of a micro-structure. Alternatively, the laser light is split into multiple laser light beams and frequency shifted so that the laser light beams will be of different frequencies. The laser light beams are imaged at respective different focal point positions to perform heterodyne detection. The resulting heterodyne signals are separated into respective frequency bands and measurement is made of the structure of the object for measurement in association with the respective imaging points. This enables measurement of the structure of the object for measurement in the direction along its depth.

43 Claims, 16 Drawing Sheets

MEASUREMENT METHOD AND APPARATUS

RELATED APPLICATION DATA

The present application claims priority to Japanese Application No. P10 187774 filed Jul. 2, 1998, which application is incorporated herein by reference to the extent permitted by law.

BACKGROUND OF THE INVENTION

1. Field of the Invention

This invention relates to a method and apparatus for measuring the structure of an object by heterodyne detection or homodyne detection employing the laser light.

2. Description of the Related Art

For measuring the structure of an object, an optical microscope has so far been used extensively. In an ordinary optical microscope, the observing light is illuminated on the object for measurement, and observation is made of the intensity distribution of the observing light transmitted through the object or that of the light reflected from the object for measurement. The limit of resolution of the optical microscope is determined by the limit of optical diffraction. That is, if the wavelength of the light for observation is $\lambda$ and the numerical aperture of the object lens is NA, the spatial wavelength of the limit of resolution in an optical microscope adapted for observing only the light intensity distribution is expressed by $\lambda/2 \times NA$. In such optical microscope, the light for observation is extremely weak in the vicinity of the limit of resolution to render the observation difficult.

On the other hand, there is proposed a technique of measuring the structure of the object by heterodyne or homodyne detection as a technique which enables the measurement of a fine textured structure even with the weak light. With the heterodyne or homodyne detection, it becomes possible to measure the fine textured structure with the weak light by employing the laser light superior in coherence as the light for observation and by exploiting the phase information of the laser light.

The principle of the technique of exploiting the phase information of light is disclosed in, for example, The Antenna Properties of Optical Heterodyne Receivers, Appl. Oct., vol.5 (1966) 1588 to 1594. There is also disclosed in Probing of Acoustic Perturbations by Coherent Light Appl. Output terminal, vol.8 (1969) 1572 to 1573 a technique of measuring the intensity and the phase of the reflected light from the object under measurement by exploiting wavelength shift by an acousto-optical element of a carrier signal f1 and by synchronously detecting beat signals of the frequency f1.

There is disclosed in U.S. Pat. No. 3,796,495 entitled:"Apparatus and Method for Scanning Phase Profilometry" a technique of differential heterodyne detection of two transversely shifted beams. There is disclosed in U.S. Pat. No. 4,171,159 entitled: "Optical Homodyne Microscope" a technique of effecting homodyne detection with mechanical phase modulation by a piezoelectric element. There is disclosed in U.S. Pat. No. 4,353,650 entitled: "Laser Heterodyne Surface Profiler" a technique of illuminating both the reference light and the detection light on the object for measurement and causing rotation of the object about the reference light as center of rotation to effect phase measurement. In the U.S. Pat. Nos. 4,627,730 and 4,848,908, there is disclosed a technique of illuminating both the reference light and the detection light on the object for measurement and employing a common optical path to improve resistance against oscillations. There is disclosed in Japanese Laying-Open Patent H-7-248203 a laser scanning microscope exploiting the heterodyne detection.

There is further disclosed the result of observation of a pseudo-living body sample by heterodyne detection in the visible light range in a thesis entitled: "Measurement of Spectroscopic Transmission Characteristics in the Visible Range to the Near-Infrared Range of a Pseudo-Living Body Sample Employing Optical Heterodyne Detection Method" in Optics Vol.27.1 (1998) 40 to 47.

By exploiting heterodyne or homodyne detection, it becomes possible to measure the fine textured structure with weak light. Of course, it would be meritorious if measurement can be made of a micro-sized structure. It would be more meritorious if measurement can be made not only of the planar direction but also of the depth-wise direction of the object for measurement.

SUMMARY OF THE INVENTION

It is therefore an object of the present invention to provide a method and apparatus for measuring the structure of an object for measurement by exploiting heterodyne or homodyne detection, whereby measurement can be made of a micro-sized structure of the object for measurement.

It is another object of the present invention to provide a method and apparatus for measuring the structure of an object for measurement by exploiting heterodyne or homodyne detection, whereby measurement can be made of a structure along the depth-wise direction of the object.

In one aspect, the present invention provides a measurement device including ultraviolet laser light generating means for generating ultraviolet laser light by wavelength conversion of laser light from a solid-state laser light source, and measurement means for measuring the structure of an object for measurement by heterodyne detection or homodyne detection employing the ultraviolet laser light. Specifically, the ultraviolet laser light means the laser light having the wavelength of the order of 180 to 360 nm.

Preferably, the solid-state laser light source is oscillated in a single longitudinal mode.

Preferably, the solid-state laser light source is a diode laser pumped solid state laser pumped by the laser light from a semiconductor laser to radiate laser light. The diode laser pumped solid state laser preferably includes a monolithic ring type optical resonator. The laser light from a semiconductor laser falls on the monolithic ring type optical resonator to excite the laser medium to radiate the laser light. The diode laser pumped solid state laser is preferably configured so that the optical path in the monolithic ring type optical resonator is non-coplanar.

Preferably, the solid-state laser light source includes semiconductor laser and a wavelength selecting element and the laser light from the semiconductor laser is radiated via the wavelength selecting element to radiate the laser light of a single frequency.

The ultraviolet laser light generating means preferably generates the ultraviolet laser light by wavelength conversion by multiple stages.

As the wavelength converting means, a nonlinear optical element, formed as a ring type resonator, is desirable. The laser light from the solid-state laser light source is resonant in the nonlinear optical element, and the nonlinear optical element generates harmonics or the sum frequency to effect the wavelength conversion.

The wavelength converting means preferably includes an optical resonator made up of multiple mirrors and a nonlinear optical element arranged in the optical resonator. The laser light from the solid-state laser light source is resonant in the optical resonator, with the nonlinear optical element generating harmonics or the sum frequency to effect the wavelength conversion. Preferably, the position control means precisely controls the position of the mirrors making up the optical resonator.

Preferably, the measurement means includes movement means for causing movement of an object for measurement. The movement means causes movement of the object for measurement so that a light spot of the ultraviolet laser light scans the object for measurement at the time of measuring the structure of the object for measurement.

Preferably, the measurement means includes deflection means for deflecting the ultraviolet laser light to control the proceeding direction of the ultraviolet laser light. The deflection means causes deflection of the ultraviolet laser light so that the ultraviolet laser light will be incident on a pre-set position of the object for measurement at the time of measuring the structure of the object for measurement. Alternatively, the deflection means causes deflection of the ultraviolet laser light so that a light spot of the ultraviolet laser light will scan the object for measurement at the time of measurement of the object for measurement.

Preferably, the measurement means includes light splitting means for splitting the ultraviolet laser light into the detection light illuminated on the object for measurement and reference light for heterodyne or homodyne detection.

For heterodyne detection, the measurement means preferably includes frequency shifting means for frequency shifting at least one of the detection light and the reference light. The frequency shifting means preferably is an acousto-optical modulator.

For homodyne detection, the measurement means preferably includes phase shifting means for shifting the phase of at least one of the detection light or the reference light. The phase shifting means is preferably an electro-optical phase modulator. The phase shifting means preferably includes a mirror arranged on an optical path of the detection light and/or the reference light and a mirror position controlling means for controlling the position of the mirror. The mirror position controlling means controls the position of the mirror by mirror phase control means for shifting the phase of the detection light and/or the reference light.

In splitting the ultraviolet laser light by light splitting means into the detection light and the reference light, the light splitting means preferably splits the ultraviolet laser light so that the power of the reference light will be larger than that of the detection light. Specifically, the light splitting means splits the ultraviolet laser light so that the power of the reference light will be not less than 100 for the power 1 of the detection light. If the object for measurement is susceptible to damages by the ultraviolet light, the light splitting means splits the ultraviolet laser light so that the power of the detection light illuminated on the object for measurement will be not larger than 1 $\mu$w, with the reference light power being larger than the detection light power.

Preferably, the measurement means includes a photodetector for receiving the return light reflected form the object for measurement and the reference light used for heterodyne or homodyne detection, the photodetector detecting a heterodyne signal or a homodyne signal produced on interference between the return light and the reference light. The photodetector is preferably an Si-PIN photodiode, an Si-APD photodiode or a GaN photodiode.

The measurement means preferably forms multiple detection light spots on the object for measurement, with the return light of the spots being detected by multiple photodetectors. These photodetectors are preferably Si-PIN photodiodes, Si-APD photodiodes or GaN photodiodes.

It is possible for the measurement means to includes an object lens of silica, quartz or fluorite as light converging means for converging the ultraviolet laser light on the object for measurement. The measurement means preferably includes an object lens as light converging means for converging the ultraviolet laser light on the object for measurement and a protective cover for protecting the surface of the object lens.

It is possible for the measurement means to include two ultraviolet laser light generating means for generating two ultraviolet laser light beams having different wavelengths, as the ultraviolet laser light generating means. The measurement means illuminates the first ultraviolet laser light radiated from one of the ultraviolet laser light generating means. The measurement means causes the second ultraviolet laser light radiated from the other ultraviolet laser light generating means to interfere with the return light of the first ultraviolet laser light reflected back from the object for measurement by way of performing heterodyne detection.

In another aspect, the present invention provides a measurement method including generating ultraviolet laser light by wavelength conversion of the laser light from a solid-state laser light source and measuring the structure of an object for measurement by heterodyne detection or homodyne detection employing the ultraviolet laser light.

In the measurement method, preferably the ultraviolet laser light is converged by an object lens on an object for measurement at the time of heterodyne detection or homodyne detection, and liquid is arranged between the object lens and the object for measurement. The liquid may be such one as to undergo chemical reaction with the object for measurement. If the liquid is arranged between the object lens and the object for measurement, an exchangeable protective cover is fitted on the object lens.

In still another aspect, the present invention provides a measurement device including laser light generating means for generating laser light, light splitting means for splitting the laser light from the laser light generating means into multiple light beams, frequency shifting means for applying frequency shifting to the laser light so that the laser light beams split by the light splitting means will be of different frequencies, imaging means for conducting the laser light beams frequency shifted by the frequency shifting means to an object for measurement and for imaging the respective laser light beams at different focal point positions, and measurement means for performing heterodyne detection using the respective laser light beams imaged at different focal point positions by the imaging means. The measurement means separates the heterodyne signals resulting from heterodyne detection into respective frequency bands for measuring the structure of the object for measurement in association with respective imaging points.

In this measurement device, the light splitting means preferably splits the laser light from the laser light generating means into multiple light beams having different optical axes, and the frequency shifting means applies frequency shifting to each of the light beams split by the light splitting means. The light splitting means preferably is an optical block the opposite surfaces of which are mirror surfaces. The laser light incident on the light splitting means is repeatedly reflected between the opposite mirror surfaces of the optical block. The laser light is split each time it is reflected by one of the mirror surfaces into the light transmitted through the mirror surface and the light reflected by the mirror surface. The laser light repeatedly reflected between the two mirror surfaces of the optical block may be the divergent light. In this case, the split light beams have different virtual beam light emitting positions.

The light splitting means may be a first mirror and a second mirror arranged facing the first mirror and adapted for transmitting a portion of the incident light therethrough. The frequency shifting means preferably is a frequency shifter arranged between the first and second mirrors. The laser light incident on the light splitting means is repeatedly reflected between the first and second mirrors. The laser light is split each time it is reflected by one of the mirrors into the light transmitted through the mirror and the light reflected by the mirror. The laser light is frequency shifted by a frequency shifter each time it is reflected between the first and second mirrors. The laser light repeatedly reflected between the first and second mirrors may be the divergent light. In this case, the split light beams have different virtual beam light emitting positions.

In yet another aspect, the present invention provides a measurement method including splitting the laser light into multiple laser light beams and frequency shifting the laser light so that the multiple split laser light beams will be of different frequencies, conducting the frequency shifted laser light beams to an object for measurement, imaging the respective laser light beams at different focal point positions, performing heterodyne detection using the laser light beams imaged at the different focal point positions, separating the heterodyne signals obtained by the heterodyne detection into respective frequency bands and measuring the structure of the object for measurement associated with the respective imaging points.

In the measurement method, preferably the ultraviolet laser light is converged by an object lens on an object for measurement at the time of heterodyne detection or homodyne detection, and liquid is arranged between the object lens and the object for measurement. The liquid may be such one as to undergo chemical reaction with the object for measurement. If the liquid is arranged between the object lens and the object for measurement, an exchangeable protective cover is fitted on the object lens.

According to the present invention, as described above, it becomes possible to measure the structure of a finer texture in measuring the structure of an object for measurement using heterodyne detection or homodyne detection. Also, according to the present invention, it is possible to measure the structure along the depth of the object for measurement in measuring the structure of an object for measurement using heterodyne detection.

DESCRIPTION OF THE PREFERRED EMBODIMENTS

Figure 1:
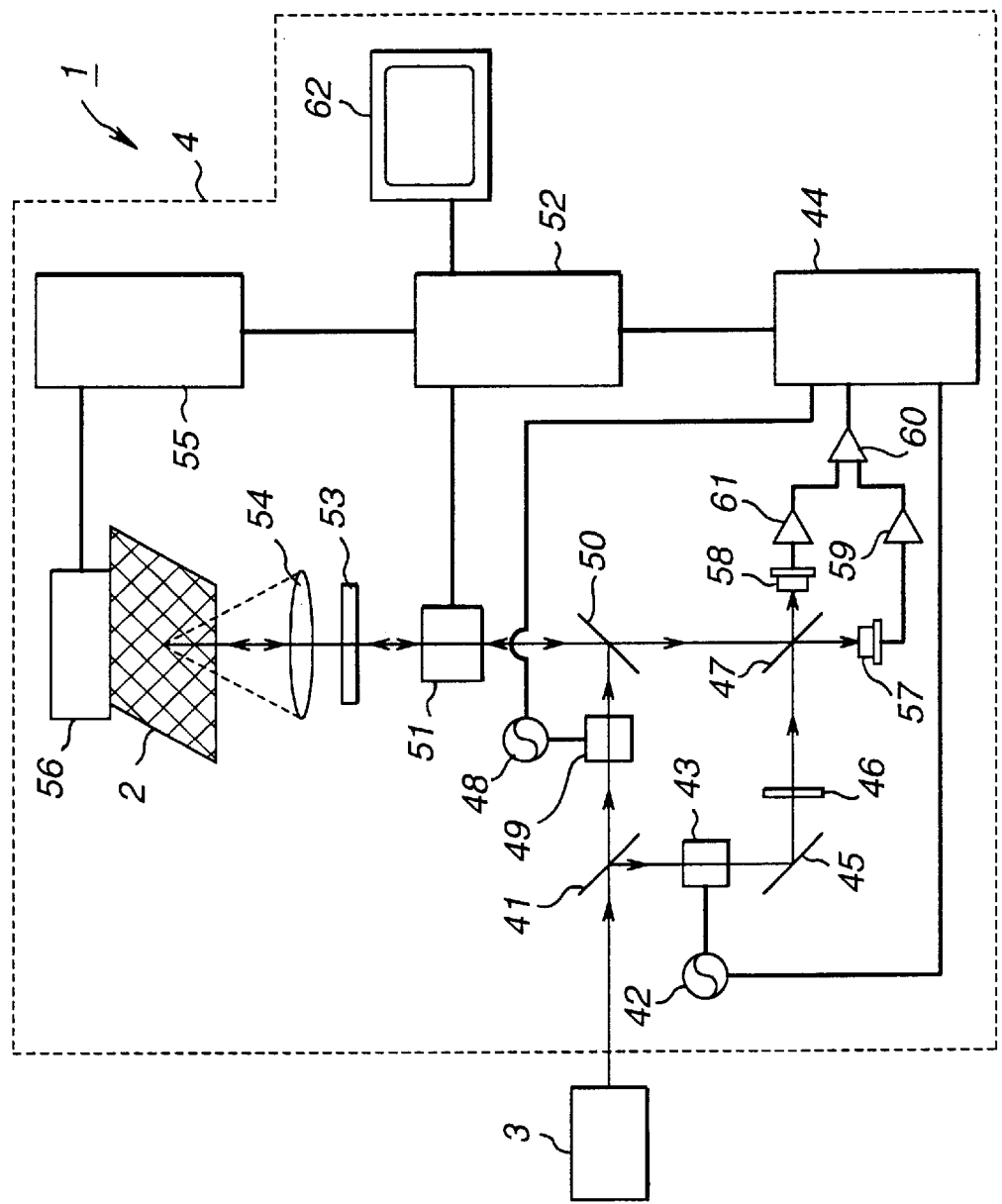
FIG. 1 shows an example of a measurement device for measuring the structure of an object for measurement by heterodyne detection.

Referring to the drawings, preferred embodiments of the present invention will be explained in detail.

FIG. 1 shows an illustrative measurement device for measuring the structure of an object under measurement by heterodyne detection. This measurement device 1 is able to measure a fine textured structure with extremely weak light by heterodyne detection, and is particularly effective for the purpose of inspecting an element having a fine textured structure, such as a semiconductor device, liquid crystal element, optical memory or a magnetic memory. Also, the measurement device 1 is a non-contact measurement device and is not liable to damage the object for measurement 2. Thus, the measurement device 1 is useful for observation of a living body susceptible to damages.

This measurement device 1 includes an ultraviolet light generating unit 3 for generating linearly polarized ultraviolet laser light by wavelength conversion of the laser light from a solid laser light source, and a heterodyne measurement unit 4 for measuring the structure of the object for measurement 2 by heterodyne detection employing the ultraviolet laser light exiting the ultraviolet light generating unit 3.

1-1 Ultraviolet Laser Light Generating Unit

Figure 2:
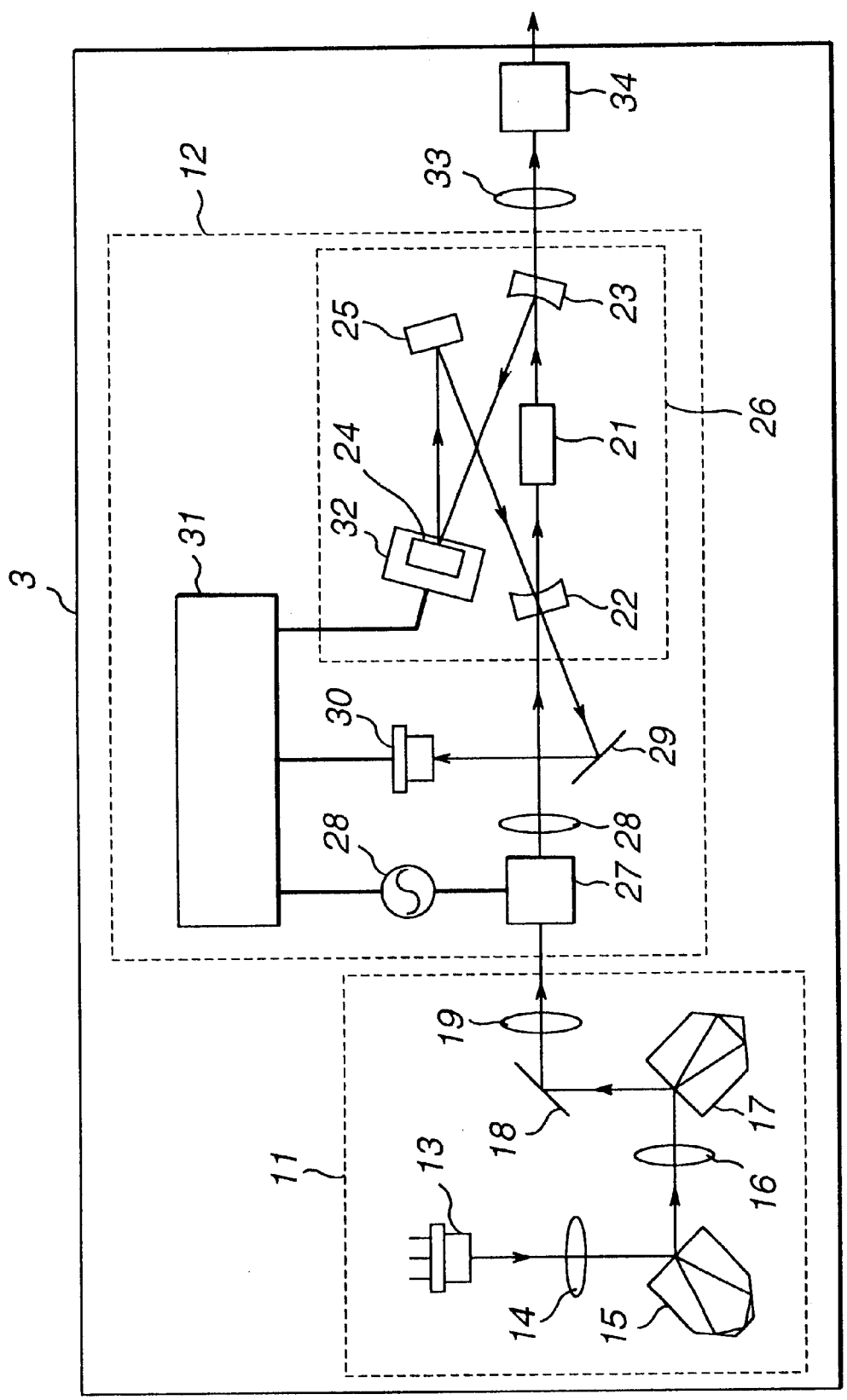
FIG. 2 shows an example of ultraviolet laser light generating means.

The ultraviolet light generating unit 3 converts the wavelength of the laser light from the solid laser light source to generate and radiate the linearly polarized ultraviolet laser light. FIG. 2 shows an illustrative ultraviolet light generating unit 3.

The ultraviolet light generating unit 3, shown in FIG. 2, includes a green laser light generating unit 11 for generating the green laser light, and an ultraviolet laser light generating unit 12 for converting the wavelength of the green laser light from the green laser light generating unit 11 to generate the ultraviolet laser light.

In the green laser light generating unit 11, a semiconductor laser 13 radiates the high-power laser light of the wavelength $\lambda$ of 808 nm. This high-power laser light is condensed by a condenser lens 14 to fall on a non-planar monolithic Nd:YAG laser 15 as pumping light pumping the Nd YAG laser 15. This pumps the Nd:YAG laser 15 to emit the infra-red laser light with a wavelength $\lambda$ equal to 1064 nm. At this time, an external magnetic field is applied across the Nd:YAG laser 15. This sets the Nd:YAG laser 15 into oscillations only in one direction in the longitudinal single mode. The principle of these oscillations is disclosed in, for example, U.S. Pat. No. 4,749,842.

Here, the monolithic ring type laser is used as the Nd:YAG laser 15. The monolithic light oscillator exhibits high oscillation stability and, as disclosed in T.Kane et al., Opt. Lett Vol.10 (1985) pp65, exhibits superior temporal coherence characteristics. Therefore, the monolithic ring type Nd:YAG laser 15 is highly useful as a light source for measurement by heterodyne detection or homodyne detection. Also, in this Nd:YAG laser 15, the optical path in the resonator preferably has a non-planar optical path surface. By having the non-planar optical path surface in the resonator, oscillations of the infra-red laser light can be stabilized further.

The infra-red laser light radiated by the Nd:YAG laser 15 falls on a monolithic ring type MgO:LiNbO$_3$ (MgO:LN) crystal 17 via a mode matching lens 16. On reception of the infra-red laser light with the wavelength $\lambda$=1064 nm, the MgO:LN crystal 17 emits second harmonics with the wavelength $\lambda$=532 nm. The optical resonator of the MgO:LN crystal 17 is designed for use with the infra-red laser light with the wavelength $\lambda$=1064 nm. If the high power density in the optical resonator is utilized, high-efficiency wavelength conversion can be realized with a continuous wave. Specifically, if the optical resonator is constructed so that the wavelength of the infra-red laser light is coincident with the resonant wavelength in the inside of the MgO:LN crystal 17, second harmonics can be generated with the high efficiency of the order of 65%.

By the generation of the second harmonics in the MgO:LN crystal 17, the green laser light with the wavelength of 532 nm, converted in wavelength from the infra-red laser light with the wavelength $\lambda$=1064 nm, is reflected by a reflective mirror 18 and shaped by a lens 19 to a pre-set beam diameter so as to be radiated from the green laser light generating unit 11.

The green laser light generating unit 11, constructed as described above, is able to generate the green laser light superior in temporal coherence characteristics with an extremely high efficiency. Meanwhile, if the 1 W laser light is radiated by the semiconductor laser 13, the infra-red laser light of the order of 500 mW is generated by the Nd:YAG laser 15, whilst the green laser light of the order of 200 mW is generated by the MgO:LN crystal 17. Thus, the green laser light generating unit 11 has an excellent efficiency. Moreover, the electrical efficiency of the semiconductor laser 13 is much higher than that of, for example, the gas laser, and is of the order of 30%. Therefore, the power consumption of the green laser light generating unit 11 is extremely small, even inclusive of power consumption by, for example, the control circuitry.

The green laser light, generated by the green laser light generating unit 11, falls on the ultraviolet laser light generating unit 12. The ultraviolet laser light generating unit 12, generating the second harmonics of the green laser light, using a $\beta$-BaB$_2$O$_4$ (BBO) 21 as a nonlinear optical element, generates the ultraviolet laser light with the wavelength=266 nm That is, the ultraviolet laser light generating unit 12 generates the green laser light as the fundamental light, while generating the ultraviolet laser light, as the second harmonics, by the BBO 21.

The BBO 21 transmits the light up to the far ultraviolet range of the wavelength of 190 nm, while being strong against laser damage and exhibiting acute double refraction. Thus, the BBO 21 is able to generate second harmonics over a wide wavelength range and is extremely convenient as an element for generating second harmonics in the far ultraviolet range. However, if the second harmonics with the wavelength $\lambda$=266 nm are to be generated by the BBO 21, angular phase matching is required, while temperature phase matching as in the MgO:LN crystal 17 cannot be used. Therefore, it is difficult to generate second harmonics using the monolithic ring type crystal as in the case of the green laser light generating unit 11. Therefore, in the ultraviolet laser light generating unit 12, a ring-type optical resonator 26, having four independent mirrors 22 to 25, is used to generate second harmonics by an external resonator.

The fundamental wave incident on the ultraviolet laser light generating unit 12, that is the green laser light, falls on the optical resonator 26 via a phase modulator 27 and a mode-matching lens 18. The optical resonator 26 is made up of first to fourth mirrors 22 to 25, with the BBO 21 being placed between the first mirror 22 and the third mirror 23.

The fundamental wave is introduced into the optical resonator 26 via the first mirror 22. The fundamental wave is partially reflected by the first mirror 22 and farther reflected by the mirror 29 towards a photodetector 30 for detection. The light introduced into the inside of the optical resonator 26 after transmission through the first mirror 22 is directed via the BBO 21 towards the second mirror 23 and thereby reflected towards the third mirror 24. The light is then reflected by the third mirror 24 towards the fourth mirror 25. The reflected light is then reflected by the fourth mirror 25 towards the first mirror 22 and further reflected by the first mirror 22 so as to be directed again via the BBO 21 towards the second mirror 23. The mirrors 21 to 24 making up the optical resonator 26 may, for example, be of design parameters shown in Table 1:

TABLE 1

| | radius of curvature | reflectance R fundamental wave (532 nm) | transmittance T second harmonics (266 nm) |
|---|---|---|---|
| first mirror 22 | 100 mm | 99.0% | — |
| second mirror 23 | 100 mm | 99.9% | not less than 90% |
| third mirror 24 | flat | 99.9% | — |
| fourth mirror 25 | flat | 99.9% | — |

The fundamental wave, reflected by the first mirror 22 of the optical resonator 26, is detected by the photodetector 30, as described above. The fundamental wave, thus reflected by the first mirror 22 of the photodetector 26, is detected by the photodetector 30, to produce a detection signal, which is routed to a control circuit 31. Also, in the ultraviolet laser light generating unit 12, the phase modulator 27 phase-modulates the fundamental wave incident on the photodetector 26 by modulation signals from a phase modulator driving circuit 28. The control circuit 31 synchronously detects the detection signal with the modulation signal to detect an error signal of the optical path phase difference of the optical resonator 26 and causes an electro-magnetic actuator 32 to be driven so that the resonator length of the optical resonator 26 will perpetually meet the resonant conditions. In this manner, the position of the third mirror 24 may be controlled precisely continuously.

By precisely controlling the position of the third mirror 24 continuously as described above, tile resonating length of the optical resonator 26 can be controlled to an extremely high precision of a few thousandth of the light wavelength. By precisely controlling the resonant length of the optical resonator 26 in this manner to meet the resonant conditions at all times, it is possible to generate second harmonics by the BBO 21 more efficiently.

Also, in the optical resonator 26, an anti-reflection film is provided on the BBO 21 to reduce the resonator loss. Moreover, high reflectance mirrors with the reflectance of 99.9% are used as the second to fourth mirrors 23 to 25, besides providing the anti-reflection film on the BBO 21, so that it becomes possible to suppress the resonator loss of the optical resonator 26 to 0.5% or less.

With the above-described ultraviolet laser light generating unit 12, the ultraviolet laser light having excellent temporal coherence characteristics can be generated with an extremely high efficiency. It was actually found that, when the ultraviolet laser light was generated by the ultraviolet laser light generating unit 12, with the output of the green laser light incident on the ultraviolet laser light generating unit 12 from the green laser light generating unit 11 set to 200 mW, the ultraviolet laser light of the order of 50 mW was produced. The output of the order of 50 mW is sufficient as an output of the light source used for heterodyne or homodyne detection.

Meanwhile, it is when the output of the semiconductor laser 13 is approximately 1W that the output of the green laser light radiated from the green laser light generating unit 11 is 200 mW. Thus, with the ultraviolet light generating unit 3, the ultraviolet laser light of approximately 50 mW can be produced by supplying the driving current to the semiconductor laser 13 so that the output of the laser light radiated by the semiconductor laser 13 will be approximately 1 W. This output of 50 mW is more than sufficient for a light source used for heterodyne or homodyne detection. In actuality, a sufficient output for heterodyne or homodyne detection can be developed even if the driving current for the semiconductor laser 13 is lowered further to reduce the power consumption.

Meanwhile, since the ultraviolet light is of high photon energy, there is a risk of deteriorating the BBO or the mirrors making up the optical resonator if it is attempted to produce the ultraviolet laser light by generating second harmonics by the BBO arranged in the optical resonator. Thus, the light source adapted to produce the ultraviolet laser light by generation of the second harmonics by the BBO arranged in the conventional optical resonator suffers from low durability and poor reliability, and hence does not lend itself to utilization as a light source for a measurement device.

However, the present inventors have found that, by attempting to improve the growth of BBO crystals or the anti-reflection film provided on the BBO, or to optimize the spot size of the light incident on the BBO, or the atmosphere in the optical resonator, sufficient reliability and durability can be realized even if the second harmonics are produced in the BBO 21 arranged within the optical resonator 26 shown in FIG. 2. Specifically, it has been ascertained that, by the above-mentioned improvement or optimization, a stable operation continuing for 1000 hours or longer may be realized if the ultraviolet laser light of 100 mW is produced, while a stable operation continuing for 5000 hours or longer is realized if the ultraviolet laser light of 30 mW is produced. From these results, it may be estimated that the durability for the ultraviolet laser light of 20 mW reaches approximately 10000 hours. With this long durability, the optical resonator 26 may be effectively handled as a maintenance-free light source, such that the light source can be put sufficiently to practical use as a light source for the measurement device.

The ultraviolet laser light, generated by the ultraviolet laser light generating unit 12 as described above, is collimated by a collimator lens 33 and beam-shaped by a pair of anamorphic prisms 34 for radiation from the ultraviolet light generating unit 3. Meanwhile, the anamorphic prisms 34 perform beam shaping so that the spot shape of the ultraviolet laser light radiated by the ultraviolet light generating unit 3 will be a substantially circular beam. The ultraviolet laser light, radiated by the optical resonator 26, is turned into an elliptically-shaped beam by the walk-off effect due to double refraction by the BBO 21. The ultraviolet light generating unit 3 radiates the ultraviolet laser light after beam shaping by the anamorphic prisms 34 so that the spot shape will be substantially of a circular shape.

The above-described UV light generating unit 3 effects wavelength conversion of the laser light from a solid laser light source (Nd:YAG laser 15) by generation of second harmonics utilizing nonlinear optical element (MgO-LN crystal 17, BBO 21) in two stages to generate UV laser light. That is, the ultraviolet light generating unit 3 operates as an all-solid ultraviolet laser light source generating the ultraviolet laser light by solely the solid-state device.

By constructing the ultraviolet light generating unit 3 solely by the solid-state element, it is possible to realize a light source of small size, high efficiency, low power consumption, high stability and high beam quality. Moreover, since the ultraviolet light generating unit 3 yields the ultraviolet laser light having superior temporal coherent characteristics, it is highly convenient as a light source for heterodyne and homodyne detection exploiting the optical phase information.

Meanwhile, there are, for example, an excimer laser or an argon laser as a light source for generating the ultraviolet laser light. These gas lasers suffer from the problem of large device size, poor efficiency and high power consumption.

For example, with an argon laser oscillated at a wavelength of 351 nm, the efficiency is usually 0.001% or less. Conversely, with the ultraviolet light generating unit 3 constituted in its entirety by a solid-state device, the efficiency is much higher, while the device size can be reduced significantly.

Moreover, in the argon laser, a large quantity of cooling water is required. Since oscillations are produced on circulation of cooling water, the argon laser in need of a large quantity of cooling water is not suited for measurement of a fine textured structure. The argon laser is poor in oscillation wavelength stability, such that it is impossible with the argon laser to perform heterodyne or homodyne detection in stability for prolonged time. The excimer laser also is in need of supply of a fluorine gas which is also hazardous. In addition, the excimer laser, subjected to pulsed oscillation with a high peak power, is not suited for use as a measurement device adapted to measure the structure of an object by heterodyne or homodyne detection.

With the above-described ultraviolet light generating unit 3, the problem raised with the use of the gas laser, such as the excimer laser or argon laser, is solved by generating ultraviolet laser light by wavelength conversion of the laser light generated by a solid laser light source.

1-2 Heterodyne Measurement Unit

The ultraviolet laser light radiated by the ultraviolet light generating unit 3 falls on the heterodyne measurement unit 4, adapted to measure the structure of the object for measurement 2 by heterodyne detection employing the ultraviolet laser light, as shown in FIG. 1.

The ultraviolet laser light radiated by the ultraviolet light generating unit 3 to fall on the heterodyne measurement unit 4 first falls on a light splitting unit 41 adapted for splitting the ultraviolet laser light into light illuminated on the object for measurement 2 (referred to below as detection light) and light for heterodyne detection (referred to below as reference light). The light splitting unit 41 partially transmits and partially reflects the ultraviolet laser light radiated from the ultraviolet light generating unit 3. The light transmitted through the light splitting unit 41 becomes the detection light, while the light reflected by the light splitting unit 41 becomes the reference light. It is noted that heterodyne detection is effected by causing the return light of the detection light from the object for measurement 2 to interfere with the reference light.

The effective splitting ratio of the light splitting unit 41 is set so that the branching ratio to the reference light will be larger than that to the detection light. Specifically, the light is split so that, with the detection light of 1, the reference light will be not less than approximately 100. This increases the SN ratio of the heterodyne signal obtained by the measurement of the object for measurement 2. Also, in splitting the ultraviolet laser light by the light splitting unit 41, the power of the detection light is set to approximately 1 $\mu$W or less. This avoids damages otherwise done to the object for measurement 2 by the illumination of the ultraviolet laser light.

As the light splitting unit 41, such a light reflecting mirror is used, which is comprised of a dielectric multi-layer film formed on a substrate and in which, if the ultraviolet light falls thereon at 45°, and the incident light is the S-polarized light, it is reflected in an amount of 99.5% or more, whereas, if the incident light is the P-polarized light, it is transmitted in an amount of approximately 1%. In the present case, the ultraviolet laser light from the ultraviolet light generating unit 3 is adapted to fall on the light reflecting mirror as P-polarized light. This splits the radiated ultraviolet laser light from the ultraviolet light generating unit 3 into the reference light and the detection light at a splitting ratio of approximately 100:1.

The reference light reflected by the light splitting unit 41 falls on a frequency shifter 43, driven by a frequency shifter driving unit 42, and thereby subjected to frequency shifting. The frequency shifter driving unit 42 drives the frequency shifter 43 at a pre-set carrier frequency f1 based on a control signal from a heterodyne signal processing unit 44. When the reference light, obtained on splitting by the light splitting unit 41, falls on the frequency shifter 43, driven at the pre-set carrier frequency f1, it is shifted in frequency in an amount corresponding to the carrier frequency f1 with respect to the reference light.

Specifically, an acousto-optical modulator, employing quartz, silica, BBO or LBO, is used as the frequency shifter 43, and is driven at the carrier frequency f1=200 MHz, by the frequency shifter driving unit 42. The first order diffracted light of Bragg's diffraction at the acousto-optical modulator is outputted at this time as the frequency shifted reference light with the frequency of 200 MHz.

The reference light, shifted in frequency by the frequency shifter 43, is reflected by a light reflecting mirror 45 to fall on and pass through a half wave plate 46. The reference light transmitted through the half wave plate 46 falls on a wave combining mirror 47. The half wave plate 46 is used for equating the orientation of polarization of the reference light to that of the detection light on the wave combining mirror 47.

On the other hand, the detection light transmitted through the light splitting unit 41 falls on a frequency shifter 49, driven by the frequency shifter driving device 48, for frequency shifting. The frequency shifter driving device 48 drives the frequency shifter 49 at a pre-set carrier frequency f2 based on the control signal from the heterodyne signal processing unit 44. By the detection light split by the light splitting unit 41 from the ultraviolet laser light falling on the frequency shifter 49 driven at the pre-set carrier frequency f2, the detection light is shifted in frequency in an amount corresponding to the carrier frequency f2.

Specifically, an acousto-optical modulator of, for example, quartz, silica, BBO or LBO, is used as the frequency shifter 49, and is driven by the frequency shifter driving device 48 at the carrier frequency f2 of 212 MHz. The first order diffracted light of the Bragg's diffraction at the acousto-optical modulator is outputted as a detection light subjected to a frequency shifting of 212 MHz.

It is noted that, in heterodyne detection, frequency shifting of the detection light is not indispensable and may be omitted if desired. However, if the detection light also is shifted in frequency, the frequency difference between the reference light and the detection light can be controlled to high precision to enable heterodyne detection to higher precision. Also, if an acousto-optical modulator is used as the frequency shifter 49 for the detection light, it becomes similarly possible to control the light intensity of the detection light illuminated on the object for measurement 2 by adjusting the driving voltage of the acousto-optical modulator.

The detection light, frequency shifted by the frequency shifter 49, falls on a polarization beam splitter 50 for reflection. The detection light reflected by the polarization beam splitter 50 falls on a beam deflection unit 51 whereby it has its optical axis deflected angularly. The role of the beam deflection unit 51 is to adjust the spot position of the detection light illuminated on the object for measurement 2. That is, the beam deflection unit 51 adjusts the spot position of the detection light illuminated on the object for measurement 2 by performing angular deflection of the optical axis of the detection light, based on the control signal from a image controller 52, so that, by measuring the structure of the object for measurement 2 by the measurement device 1, an image of a desired site of the object for measurement 2 will be produced. As deflection means loaded on the beam deflection unit 51, a galvano mirror, a polygon mirror or an acousto-optical modulator may, for example, be used.

The detection light, having its optical axis deflected by the beam deflection unit 51, falls on the quarter wave plate 53. The detection light is transmitted through the quarter wave plate 53 to fall on an object lens 54. The role of the quarter wave plate 53 is to cause the return light of the detection light from the object for measurement 2 to be transmitted through the polarization beam splitter 50.

The object lens 54 is preferably larger in the numerical aperture NA, specifically, of the order of not less than 0.4. If the numerical aperture NA of the object lens 54 is larger, the light spot converged by the object lens 54 may be reduced in diameter to improve the resolution capability of the measurement device 1.

The object lens 54 is preferably formed of an optical material having a sufficiently high light transmittance in the ultraviolet range. The optical material having a sufficiently high light transmittance in the ultraviolet range may be made by silica or fluorite. Meanwhile, if the object lens 54 is constructed only of the specified optical materials, it is in general difficult to correct chromatic aberration. However, with the measurement device 1, in which the ultraviolet laser light having a narrow light emission line width, resulting from the wavelength conversion of the laser light from the solid laser light source, is used as the detection light, it is possible to avoid the problem of chromatic aberration of the object lens 54. Specifically, the object lens 54 is evaluated and optimized at the outset by an interferometer employing a light source of the same wavelength as that of the detection light. This solves the problem of chromatic aberration of the object lens 54.

The detection light incident on the object lens 54 is converged on the object for measurement 2 by the object lens 54 to form a small-sized light spot thereon. The object for measurement 2 is mounted on a movable stage 56, the operation of which is controlled by a stage controller 55, and hence the object for measurement 2 is controlled in its movement by the movable stage 56 so that a desired measurement area will be scanned by the detection light spot. That is, for measuring the structure of the object for measurement 2, the movable stage 56 is caused to be moved by the stage controller 55 based on the control signal from the image controller 52 whereby the object for measurement 2 is scanned by the detection light spot converged by the object lens 51.

The scanning of the detection light spot may be effected not by movement of the object for measurement 2 by the movable stage 56, but by movement of the detection light illuminating position by the beam deflection unit 51, or by the combination of the movement of the object for measurement 2 by the movable stage 56 and the movement of the detection light illuminating position by the beam deflection unit 51.

If multiple objects for measurement 2 are repeatedly exchanged for inspection, it is preferred to provide transporting means for automatically transporting the objects 2 onto the movable stage 56. That is, if the measurement device 1 is used for inspecting the semiconductor devices, liquid crystal elements, optical memories or magnetic memories, formed on a wafer, it is preferred to provide transporting means for automatically transporting the wafers as objects for inspection onto the movable stage 56.

The detection light converged by the object lens 54 is reflected thereby so that it is turned into light carrying the information on the structure of the object for measurement 2. The detection light then is returned to the object lens 54. This return light is transmitted through the object lens 54, quarter wave plate 53, beam deflection unit 51 and the polarization beam splitter 50 to fall on the combining mirror 47.

The combining mirror 47 is used for superimposing the return light from the object for measurement 2 and the reference light and is made up of a half mirror. On one of the surfaces of the combining mirror 47 is incident the reference light processed with frequency shifting. On the opposite side surface of the combining mirror 47 is incident the return light which is the detection light reflected back from the object for measurement 2. The reference light reflected by the combining mirror 47 and the return light transmitted through the combining mirror 47 are superimposed to fall on the photodetector 58 for detection. The photodetectors 57, 58 are preferably Si-PIN photodiodes, Si-APD photodiodes or GaN photodiodes.

An output of the photodetector 57 is amplified and fed to a comparator 60, while an output of the other photodetector 58 is amplified by the amplifier 61 and fed to the comparator 60. The difference between the outputs of the photodetectors 57, 58 is taken by the comparator 60 to generate a difference signal which is fed to a heterodyne signal processor 44 to permit detection of the heterodyne signal containing the phase information.

Meanwhile, the reference light and the return light incident on the photodetector 57 and the reference light and the return light incident on the opposite side photodetector 58 are reversed in phase by being passed through the combining mirror 47. Thus, the output of the photodetector 57 and that of the photodetector 58 are reversed in polarity from each other. Therefore, by taking the difference between the output of the photodetector 57 and that of the photodetector 58, it is possible to obtain a larger output than if the sole photodetector is used. The difference taking has an additional merit that unneeded dc bias component can be removed.

The difference signal inputted to the heterodyne signal processor 44 is processed with, for example, synchronous detection, to take out the light intensity information and the phase information. The respective information is sent to the image controller 52. It is noted that the image controller 52 sends control signals to the beam deflection unit 51 and to the stage controller 55 to control the position of the detection light spot converged on the object for measurement 2. Therefore, the image controller 52 has the control information for the detection light spot converged on the object for measurement 2. Thus, the image controller 52 processes the image based on the position information and on the intensity information and the phase information sent from the heterodyne signal processor 44 to display a image representing the results of measurement of the structure of the object for measurement 2 on an image display unit 62.

If transporting means for automatically transporting the object for measurement 2 on the movable stage 56 is provided and multiple objects for measurement 2 are repeatedly exchanged for inspection, it is preferred to provide a controller for controlling the inspection process. In this case, the measured results of the structure of the objects for measurement are sent to the controller to control the entire inspection process by the controller.

1-3 Modification

In the measurement device 1, frequency shifters 49, 43 comprised of acousto-optical modulators are used as means for modulating the reference light and the detection light for producing the heterodyne signals. Alternatively, electro-optical phase modulators, employing BBOs, may also be used as means for modulating the reference light and the detection light for producing the heterodyne signals.

Also, in the measurement device 1, the ultraviolet laser light is split by the light splitting unit 41 into the reference light and the detection light for producing the heterodyne signals. Alternatively, two ultraviolet laser light generating means with slightly different oscillation wavelengths may be provided for producing the reference light and the detection light. That is, two ultraviolet laser light generating means with slightly different oscillation wavelengths may be provided and the ultraviolet laser light from these ultraviolet laser light generating means may be used separately as the reference light and the detection light.

The measurement device 1 is configured as a one-beam cofocal microscope adapted for forming a sole detection light spot on the object for measurement 2 and for detecting the return light by the photodetectors 57, 58. Alternatively, multiple detection light spots may be formed on the object for measurement 2 and the return light may be detected by multiple photodetectors. This enables the structure of the object for measurement 2 to be measured at multiple points simultaneously. If the return light is detected by multiple photodetectors, Si-PIN photodiodes, Si-APD photodiodes or GaN photodiodes may be used.

1-4 Results of Measurement

The structure of the object for measurement 2 was actually measured on the measurement device 1. The laser light power was set so that the reference light power incident on the photodetectors 57, 58 after combination by the combining mirror 47 are approximately 1 mW, with the return light power being approximately 600 nW. The carrier frequency f1 of the frequency shifter 43 on the reference light side and the carrier frequency f2 of the frequency shifter 49 on the detection light side were set to 200 MHz and to 212 MHz, respectively.

Figure 3:
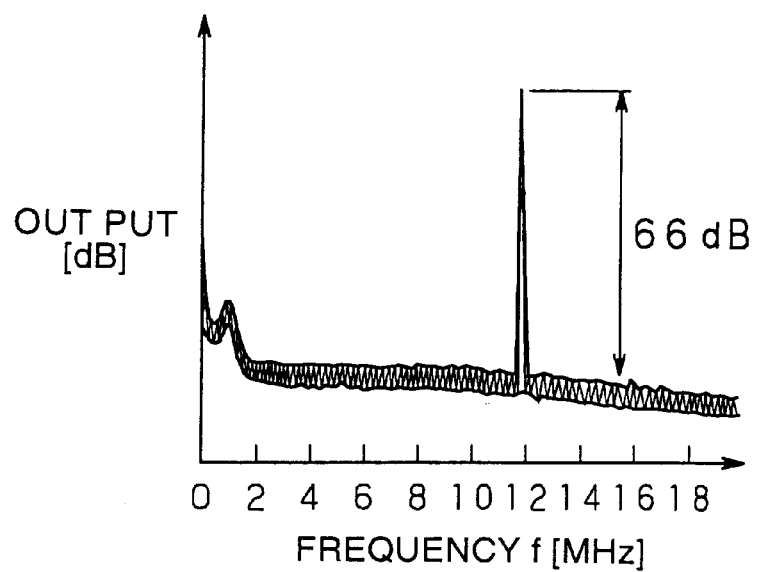
FIG. 3 shows the results of analysis of the frequency components of heterodyne signals by a spectrum analyzer.
Figure 4:
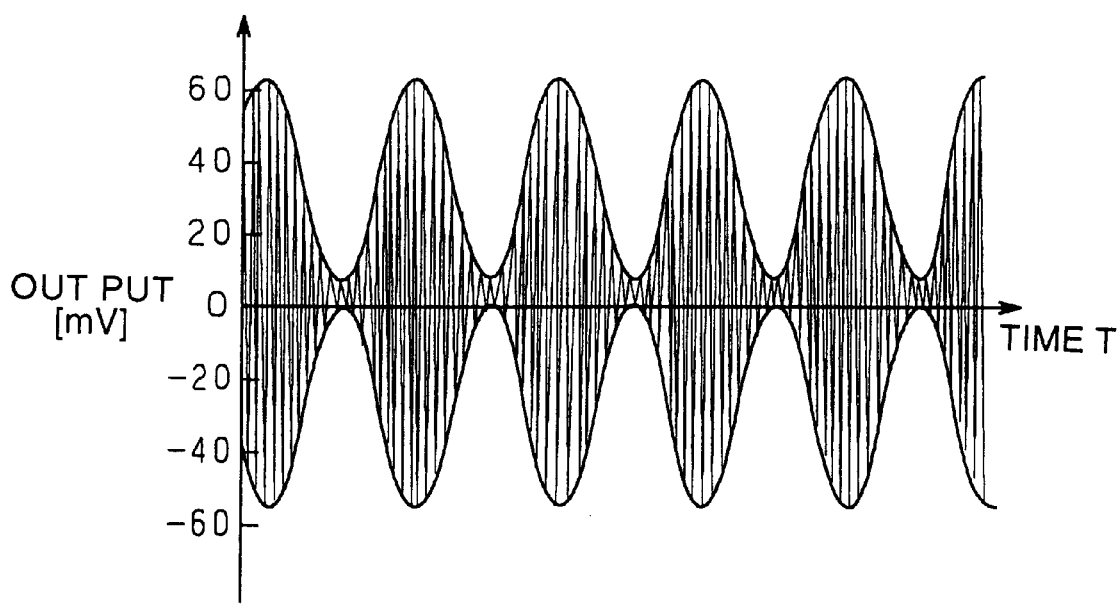
FIG. 4 shows an envelope of heterodyne signals in the event of AM modulation of the return light.

Thus, a heterodyne signal of a frequency corresponding to the difference between the carrier frequency f1 of the frequency shifter 43 on the reference light side and the carrier frequency f2 of the frequency shifter 49 on the detection light side (f2−f1=12 MHz) was detected. Moreover, despite the fact that the powers of the return light incident on the photodetectors 57, 58 are as weak as approximately 600 nW, a heterodyne signal with an optimum SN ratio of 66 dB (bandwidth of 30 kHz) was obtained, as shown in FIG. 3. In FIG. 4, there is shown an envelope of a heterodyne signal on amplitude modulation of the return light having the peak output of approximately 600 nW. It may be seen that the weak return light is detected with an optimum SN ratio by the heterodyne principle.

Also, the powers of the return light incident on the photodetectors 57, 58 were changed, with the powers of the reference light falling on the photodetectors 57, 58 after combination by the combining mirror 47 remaining constant at 0.98 mW. The changes in the SN ratio of the heterodyne signals, detected at this time, were measured. Meanwhile, the photodetectors 57, 58 having sensitivity of 0.1 A/W were used. The outputs of the photodetectors 57, 58 were subjected to current/voltage conversion using a load resistance of 5 kΩ and were routed to amplifiers 59, 61 for amplification by 18 dB.

Figure 5:
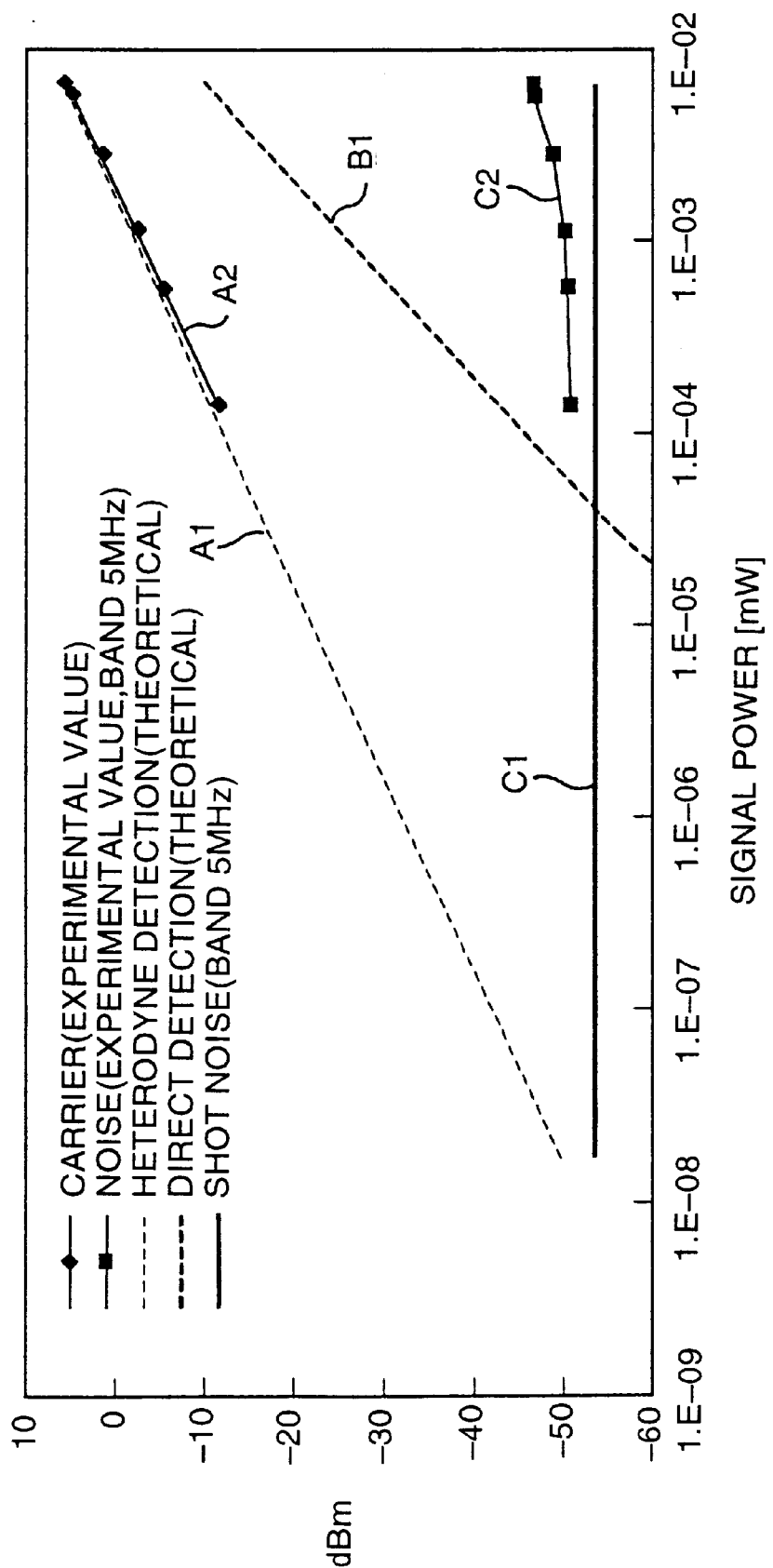
FIG. 5 shows changes in the carrier and the noise in the event of changing the power of the return light incident on a photodetector for a constant reference light power.

The measured results are shown in FIG. 5. The frequency band of approximately 5 MHz is required for image display at a video rate (⅟30 sec). FIG. 5 shows empirical and theoretical values of the carrier and the noise in this frequency band. Referring to FIG. 5, a broken line A1 shows the theoretical value of the carrier in the band of 5 MHz, with a solid line A2 indicating the empirical value of the carrier in the band of 5 MHz as detected by heterodyne detection. Also, a broken line B1 indicates a theoretical value of the carrier in the 5 MHz band obtained on direct detection of the return light without heterodyne detection, whilst a solid line C1 and a solid line C2 indicate theoretical value of the shot noise at the frequency band of 5 MHz and the experimental value of the noise at the frequency band of 5 MHz, respectively.

As may be seen from FIG. 5, if the return light is directly detected without heterodyne detection, it is not possible to obtain a sufficient SN ratio with light power not larger than 10 μW. Conversely, a high SN ratio can be realized with an extremely weak light power if heterodyne detection is used.

For realizing a satisfactory image in displaying a image at the video rate, the SN ratio not less than approximately 40 dB is desirable in order to realize an optimum image. As may be seen from FIG. 5, it is for the return light power of approximately 150 nW that the SN ratio on heterodyne detection is 40 dB. That is, if the heterodyne detection is used, the SN ratio of 40 dB, which gives a satisfactory image, can be realized with an extremely weak power of the order of 150 nW.

As may also be seen from FIG. 5, the limit detection power, for which the shot noise becomes equivalent to the carrier, is as small as approximately 20 pW, if heterodyne detection is used.

As may also be seen from FIG. 5, an empirical value of the noise is substantially coincident with the calculated shot noise. It follows from this that shot noise limit detection is sufficiently possible if the Si-PIN photodiodes, Si-APD photodiodes or GaN photodiodes are used as the photodetectors 57, 58 without employing photodetectors in need of high voltage, such as photomultipliers.

Meanwhile, if the reference light power is equal to the detection light power, the SN ratio is equivalent to the value in case the return light is directly detected without using heterodyne detection. Therefore, in using heterodyne detection, it is desirable that the reference light power be sufficiently larger than the detection light power. In the measurement device 1, the ultraviolet laser light is split by the light splitting unit 41 into the reference light and the detection light at a ratio of approximately 100:1, so that an extremely high SN ratio can be realized in the measurement device 1. Meanwhile, the condition for detecting the weak light with a high SN ratio by heterodyne detection (detection light<reference light) is shown in A. Yariv: Optical Electronics third ed. (Holt Reinhart and Minston, New York, 1985), chap. 11: translated by K. Tada, Basics of Opto-Electronics, issued by MAkUZEN, Tokyo, 1988, pp383.

1-5 Advantages of the Above Measurement Device

With the measurement device 1, a fine textured structure of a submicron order can be measured by employing the ultraviolet laser light and by adopting the heterodyne detection. That is, with the above-described measurement device 1, high resolution can be achieved by employing the light of shorter wavelength, while phase changes such as changes in the height of the object for measurement 2 or in the refractive index can be detected by detecting the light phase information by heterodyne detection, so that surface states or micro-sized defects of the object for measurement 2 can be measured to a sub-micron order. Moreover, since the structure of the object for measurement 2 is measured optically, the structure of the object for measurement 2 can be measured under an atmospheric condition in a non-contact and non-destructive manner.

As a device for measuring the micro-structured structure of a micron- or submicron order, a scanning electron microscope (SEM) is used extensively. However, with the SEM, employing an electron beam, measurement needs to be executed in a vacuum vessel, so that the device is bulky and the operation preparatory to measurement is also time-consuming. If the object for measurement is an insulator, it is also necessary to from an electrically conductive film on the surface of the object for measurement to prevent surface charge from being accumulated due to deposition of scanning electrons. Moreover, since the electron beam is of high energy, the object for measurement may be damaged by illumination of the electron beam.

As means for measuring the structure of finer texture, there are also an inter-atomic force microscope (AFM) employing the interatomic force of a small-sized needle point and a scanning type near field optical microscope (SNOM) for measuring the structure of an object for measurement using stray light from a micro-sized aperture. If the AFM or the SNOM is used, the micro-structured structure of the nm order can be measured, however, since it is necessary to scan the micro-sized needle point or the micro-sized aperture, measurement tends to be protracted. Moreover, the measured results are changed depending on the shape of the micro-sized needle point or the micro-sized aperture, thus worsening reproducibility of measured results.

Conversely, with the measurement device 1, optically measuring the object for measurement 2, the structure of the object for measurement 2 can be measured in a non-contact and non-destructive fashion under atmospheric environment. Moreover, with the present measurement device 1, employing the ultraviolet laser light and heterodyne detection, it is possible to realize a resolution markedly higher than with the conventional optical microscope.

Also, if the measurement device 1 is used, it is possible to inspect a device having a fine structure such as a semiconductor device, liquid crystal device, optical memory or a magnetic memory in the process of its fabrication. Such device is collectively termed a micro-structured device. The SEM, AFM or the SNOM could not be used except for reject analyses of micro-structured devices or when performing the extracting inspection of the micro-structured device by destructive tests, because of the aforementioned problems. However, with the measurement device 1, in which the structure of the object for measurement 2 can be measured in a non-contact and non-destructive fashion under atmospheric environment, these structures can be measured in the process of fabrication of the micro-structured devices. By measuring and inspecting the structures of the micro-structured devices in the process of fabrication thereof, it is possible to improve the production yield of the micro-structured devices. That is, if the measurement device 1 is integrated with the production system of the micro-structured devices to inspect the quality of the micro-structured devices during manufacture by way of conducting so-called in-line inspection, it is possible to improve the production yield of the micro-structured devices.

Recently, the design rule for a semiconductor device is refined to the order of 0.25 $\mu$m. It may be predicted that the design rule for the next-generation semiconductor device will be refined to the level of 0.1 $\mu$m. If it is attempted to inspect such semiconductor device, conventional optical microscopes employing visible light is not sufficient. However, if the heterodyne detection is used in the measurement device 1 in conjunction with the ultraviolet laser light, it is possible to realize the resolution necessary for inspection of the semiconductor device. Thus, if the measurement device 1 is used for in-line inspection of the semiconductor devices, it is possible to inspect the quality of the semiconductor device in the process of the fabrication to render it possible to improve the production yield of the semiconductor devices significantly.

Also, with the measurement device 1, the structure of the object for measurement 2 can be inspected in a non-contact and non-destructive fashion under atmospheric environment. Therefore, the measurement device 1 can be used effectively for observing changes in the structure of the object for measurement which is varied with lapse of time.

1-6 Damages to the Object for Measurement

The measurement device 1, which is a non-contact type measurement device, uses the ultraviolet laser light as the detection light, so that the object for measurement 2 tends to be damaged by the ultraviolet laser light. Specifically, the energy of light photons in the far-infrared range with the wavelength $\lambda$=200 to 400 nm tends to produce the photo-chemical reaction, such that, if the object for measurement 2 is a living body, and the power of the ultraviolet laser light is excessively large, the object for measurement 2 tends to be damaged. On the other hand, if the object for measurement 2 is formed of a polymer material, and the power of the ultraviolet laser light is excessively large, the bonding energy between carbon and hydrogen atoms is likely to be surpassed to produce the phenomenon of ablation.

However, with the measurement device 1, since an extremely weak ultraviolet laser light illuminated on the object for measurement 2 suffices, it may be said that the object for measurement 2 is hardly damaged by the ultraviolet laser light used as the detection light. This point will be discussed hereinbelow in detail.

If the wavelength $\lambda$ is 266 nm, the photon energy is 4.7 eV (=107 kcal/mol), to produce dissociation of C—C and C—H detection bondages, as discussed in "Vanguard Applied Technology of Excimer Laser", chapter 23, 1986, CMC, edited by K. Toyoda. If the 1 mW light with the wavelength $\lambda$ of 266 nm is throttled by an object lens with the numerical aperture NA of 0.9 and illuminated in this state on a polymer material, the power density of approximately 1 MW/cm$^2$ is reached to produce the ablation phenomenon.

The ablation phenomenon of the polymer material by the ultraviolet laser light with the wavelength of 266 nm is stated in, for example, "All Solid-State Continuous Wave Frequency-Quadrupled Nd:YAG Laser", IEEE J. Select. Top. In Quantum Electron. Vol. 1 (1985), 859 and in "Progress in All-Solid-State Deep-Ultraviolet Coherent Light Source", SPIE PROC. Vol. 2700 (1996), 302–310.

That is, if the power of the ultraviolet laser light used as the detection light is excessively large, the risk is high that the object for measurement 2 is damaged. Therefore, in the measurement device 1, the weak power of the ultraviolet laser light illuminated on the object for measurement 2 is desirably used.

If, for example, the measurement device 1 is used for in-line inspection of the semiconductor devices, the ultraviolet laser light used as the detection light is desirably a weak light not sensitizing the photoresist used as a mask pattern for fabrication of the semiconductor device.

For example, for forming a fine pattern in the semiconductor device with the design rule of 0.25 μm, a stepper type light exposure device employing a KrF excimer laser is used for forming its fine pattern, with the sensitivity of the photoresist used for forming the fine pattern being approximately 15 to 25 mJ/cm$^2$, as shown in "NA/Sigma Optimization Strategies for an Advanced DUV Stepper Applied to 0.25 Micron and Sub-Micron Critical Levels", SPIE PROC. Vol. 3051 (1997) pp 320 to 322.

If the light of 1 mW with the wavelength of 266 nm is swept at a video rate in an area 50 μm by 50 μm, the energy density is 1.3 J/cm$^2$, thus significantly exceeding the photoresist sensitivity. On the other hand, if the 1 μW light with the wavelength of 266 nm is swept is swept at a video rate in an area 50 μm by 50 μm, the energy density is 1.3 mJ/cm$^2$, which is significantly below the photoresist sensitivity.

As may be seen from FIG. 5, an extremely weak ultraviolet laser light illuminated on the object for measurement 2 in the measurement device 1 suffices. If the power of the laser light is of the order of the power that is used in the measurement device 1, there is no risk of the photoresist being sensitized, as may be seen from the foregoing description. That is, with the measurement device 1 embodying the present invention, an extremely small power of the ultraviolet laser light suffices, such that, if a photoresist is contained in the object for measurement 2, it is possible to measure the structure of the object for measurement 2 without sensitizing the photoresist, in other words, without damaging the object for measurement 2.

That is, with the measurement device 1 embodying the present invention, it is possible to measure the structure of the object for measurement 2 even if the power of the detection light illuminated on the object for measurement 2 is not larger than 1 μW. As apparent from the foregoing description, the structure of the object for measurement 2 can be measured without sensitizing the photoresist if the photoresist is contained in the object for measurement 2 but the power of the detection light illuminated on the object for measurement 2 is not higher than 1 μW.

As explained in the foregoing, the ultraviolet laser light of an extremely small power used as detection light in the measurement device 1 embodying the present invention suffices, such that the structure of the object for measurement 2 can be measured without damaging the structure of the object for measurement 2.

1-7 Comparison with Prior Art

In the measurement device 1, the ultraviolet laser light is split into the reference light and the detection light so that the reference light power is larger and the detection light power is smaller, whereby the ultraviolet laser light illuminated on the object for measurement 2 may be of an extremely weak power to permit the structure of the object for measurement 2 to be measured without damaging the object for measurement 2, while an extremely high SN ratio can be achieved.

Figure 6:
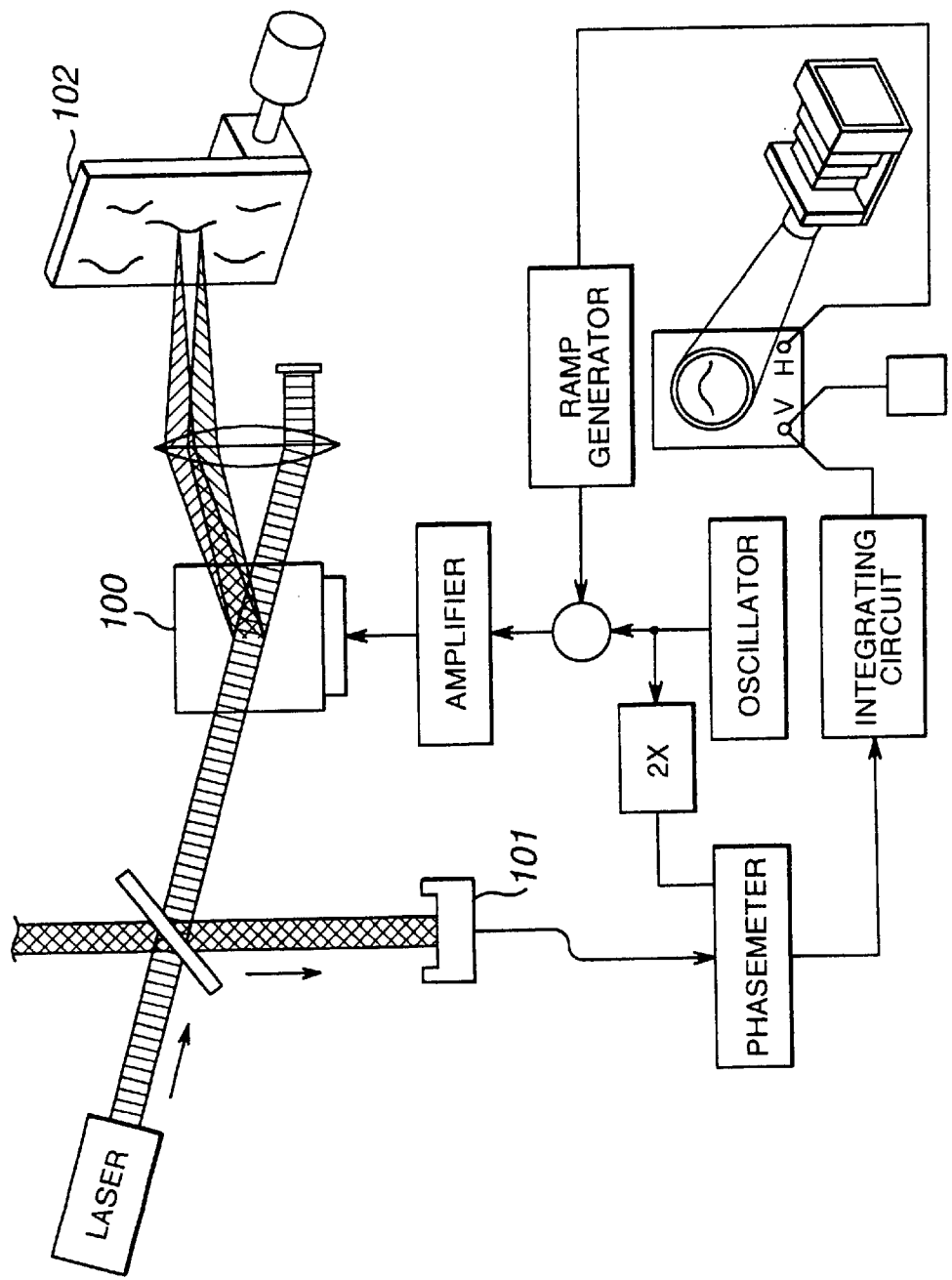
FIG. 6 shows illustrative setup for heterodyne detection by the conventional technique.

In the conventional technique, it has been difficult to reduce the power of the detection light to effect heterodyne detection efficiently. For example, the U.S. Pat. No. 3,796, 495 discloses the technique for heterodyne detection by a setup shown in FIG. 6. If, in this case, the branching ratio of the detection light of the acousto-optical modulator 100 is T, the branching ratio of the zeroth order light to the reference light is (1−T). The return light power for the detection light and the reference light is T×(1−T). for the reflectance of the object for measurement 2 equal to 1. Thus, if t=1% and the detection light is 10 μW, the reference light returned to the photodetector 101 is 10 μW, thus not satisfying the condition of detection of the weak light with a high SN ratio by heterodyne detection (detection light<<reference light).

The heterodyne detection is discussed in, for example, U.S. Pat. Nos. 4,353,650, 4,627,730 and 4,848,908. However, in these examples, both the reference light and the detection light are directed to the object for measurement, such that, if the light illuminated on the object for measurement is to be the weak light, both the detection light and the reference light need to be weak light, thus not satisfying the relation for detection with a high SN ratio (detection light<<reference light).

Thus, with the conventional technique, it has been difficult to reduce the power of the detection light and yet to realize efficient heterodyne detection, since the reference light path and the detection light path are used in common for heterodyne detection. Conversely, in the measurement device 1, since the reference light is split by the light splitting unit 41 into the detection light and the reference light, it is possible to increase the reference light power and to decrease the detection light power.

If the reference light path and the detection light path are not formed as a common path, as is done in the measurement device 1, there is produced a light path difference between the detection light path and the reference light path, so that extremely strict conditions are imposed as to wavelength stability and temporal coherence characteristics of the laser light in use. In general, a gas laser, such as excimer laser or argon laser, is mainly used as an ultraviolet laser light source. The gas laser, such as excimer laser or argon laser, is poor in wavelength stability and temporal coherence characteristics, such that it is difficult to satisfy the conditions required of heterodyne or homodyne detection. In this consequence, heterodyne or homodyne detection has not been realized with the use of the ultraviolet laser light under a condition in which difference is produced between the detection light path and the reference light path. According to the present invention, ultraviolet laser light generating means for generating the ultraviolet laser light by wavelength conversion of the laser light from a solid-state laser light source is used as the ultraviolet laser light source. This renders it possible to use the ultraviolet laser light having superior wavelength stability and temporal coherence characteristics and hence to effect heterodyne or homodyne detection under a condition of producing difference in the reference light path and the detection light path with the use of the ultraviolet laser light.

1-8 Another Example of Ultraviolet Laser Light Generating Means

The ultraviolet light generating unit 3 used in the measurement device 1 is not limited to the above-described structure since it suffices if the ultraviolet laser light can thereby be produced by wavelength conversion of the laser light from a solid-state laser light source. That is, a solid-state laser light source and a nonlinear optical element may be suitably combined to effect wavelength conversion by generation of harmonics or a sum frequency to generate ultraviolet laser light of various frequencies, and hence the ultraviolet laser light generating means used in the measurement device of the present invention are not limited to the structure shown in FIG. 2.

Specifically, the solid-state laser light source used for generating the ultraviolet laser light by wavelength conversion may be enumerated by, for example, a semiconductor laser employing AlGaAs, GaInAsP, GaN or GaInN, a solid-state laser employing a solid-state laser medium admixed with a rare-earth elements, such as Nd:YAG, Nd:YVO$_4$, Nd:YLF, Nd:YAP, Nd:SFAP, Yb:YAG or Yb:YLF, and a solid-state laser employing a solid-state laser medium admixed with transition metals, such as Cr:LiSAF, Cr:LiCAF or Ti:Al$_2$O$_3$.

If the semiconductor laser is used, it is preferred to use a wavelength selecting element, such as a diffraction grating, to permit oscillations at a single frequency. The wavelength selecting element may be assembled into the semiconductor laser itself, or arranged outside the semiconductor laser to produce the laser light of a single frequency.

The nonlinear optical elements used for generating the ultraviolet laser light by wavelength conversion may be enumerated by, for example, β-BaB$_2$O$_4$ (BBO), CsLiB$_6$O$_{10}$ (CLBO), KTiOPO$_4$ (KTP), MgO:LiNbO$_3$ (MgO:LN), LiB$_3$O$_5$ (LBO), KNbO$_3$ (KN), periodical poled inverting LiNbO$_3$ (PPLN) and periodical poled inverting LiTaO$_3$ (PPLT).

A specified illustrative technique for generating the ultraviolet laser light by wavelength conversion by harmonics generation or sum frequency generation by combining the laser light source and the nonlinear optical elements is hereinafter explained. Meanwhile, if, in generating the ultraviolet laser light by wavelength conversion, the Nd:YAG laser or the Nd:YVO$_4$ laser is used, the Nd:YAG laser or the Nd:YVO$_4$ lager is pumped by the laser light from the semiconductor laser, although this is not shown specifically.

Figure 7:
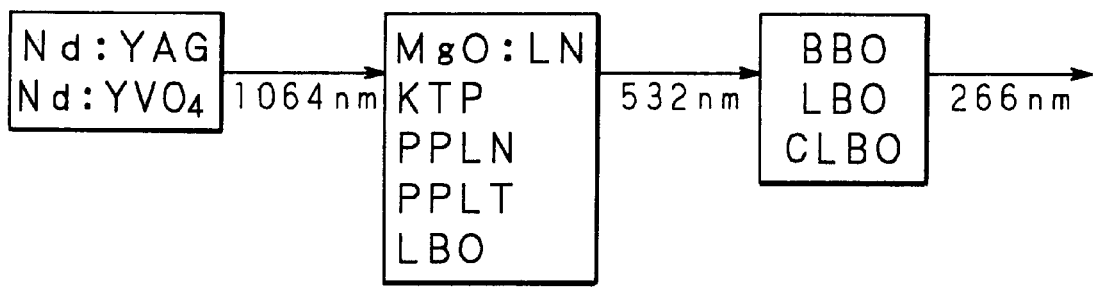
FIG. 7 shows an illustrative first technique of producing the ultraviolet laser light by wavelength conversion by harmonics generation or sum frequency generation.

FIG. 7 shows a first illustrative technique. In this technique, second harmonics with the wavelength λ=532 nm are generated, using MgO:LN, KTP, PPLN, PPLT or LBO, from the oscillating light of the wavelength λ=1064 nm from the Nd:YAG laser or the Nd:YVO4 laser. The light with the wavelength λ=532 nm is introduced into an external resonant optical resonator employing BBO, LBO or CLBO to generate second harmonics. This enables the ultraviolet laser light with the wavelength λ=266 nm to be produced. The ultraviolet light generating unit 3 is classified into this illustrative technique.

Figure 8:
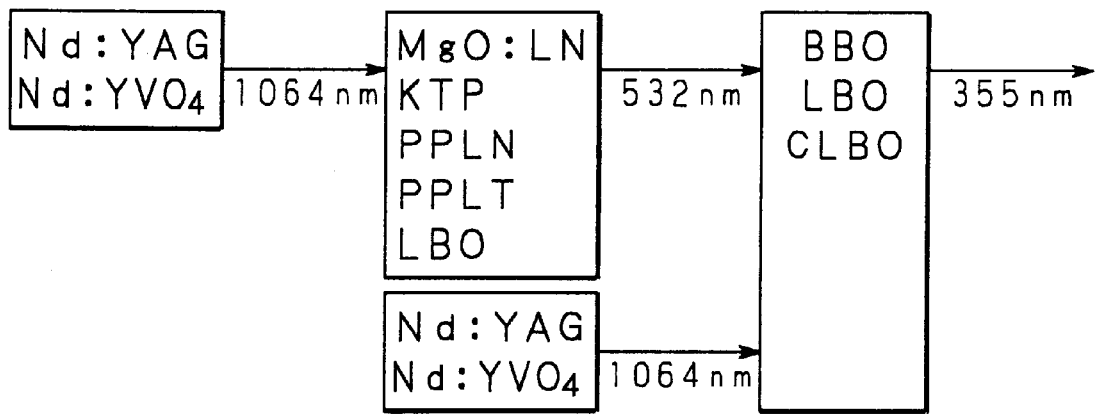
FIG. 8 shows an illustrative second technique of producing the ultraviolet laser light by wavelength conversion by harmonics generation or sum frequency generation.

FIG. 8 shows a second illustrative technique. In this technique, second harmonics with the wavelength λ=532 nm are generated, using MgO:LN, KTP, PPLN, PPLT or LBO, from the oscillating light of the wavelength λ=1064 nm from the Nd:YAG laser or the Nd:YVO4 laser. The light with the wavelength λ=532 nm and the oscillated light with the wavelength λ=1064 nm from the Nd:YAG laser or the Nd:YVO4 laser are introduced into an external resonant optical resonator employing BBO, LBO or CLBO to generate the sum frequency. This generates the ultraviolet laser light with the wavelength; λ=355 nm.

Figure 9:
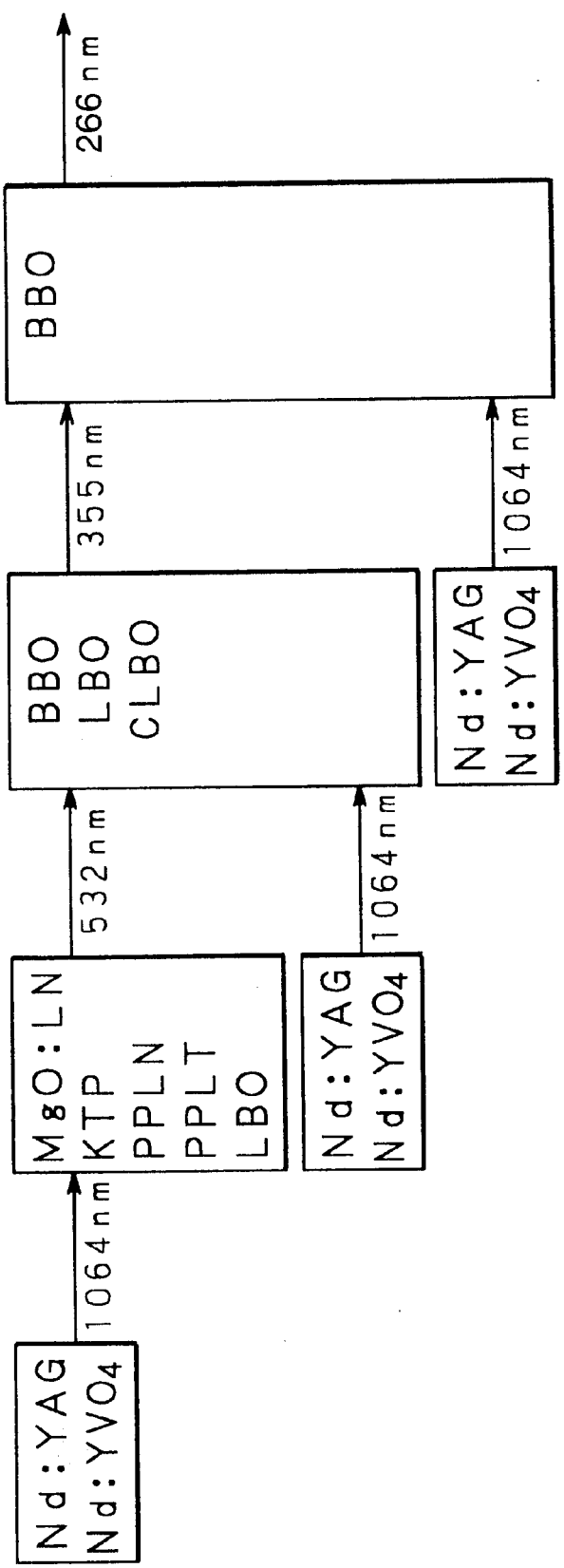
FIG. 9 shows an illustrative third technique of producing the ultraviolet laser light by wavelength conversion on harmonics generation or gum frequency generation.

FIG. 9 shows a third illustrative technique. In this technique, second harmonics with the wavelength λ=532 nm are generated, using MgO:LN, KTP, PPLN, PPLT or LBO, from the oscillating light of the wavelength λ=1064 nm from the Nd:YAG laser or the Nd:YVO4 laser. The light with the wavelength λ=532 nm and the oscillated light with the wavelength λ=1064 nm from the Nd:YAG laser or the Nd:YVO4 laser are introduced into an external resonant optical resonator employing BBO, LBO or CLBO to generate the sum frequency. This generates the ultraviolet laser light with the wavelength λ=355 nm. This ultraviolet laser light with the wavelength λ=355 nm and the oscillated light with the wavelength λ=1064 nm from the Nd:YAG laser or the Nd:YVO$_4$ laser are introduced into an external resonant optical resonator employing BBO to generate the sum frequency. This generates the ultraviolet laser light with the wavelength λ=266 nm.

Figure 10:
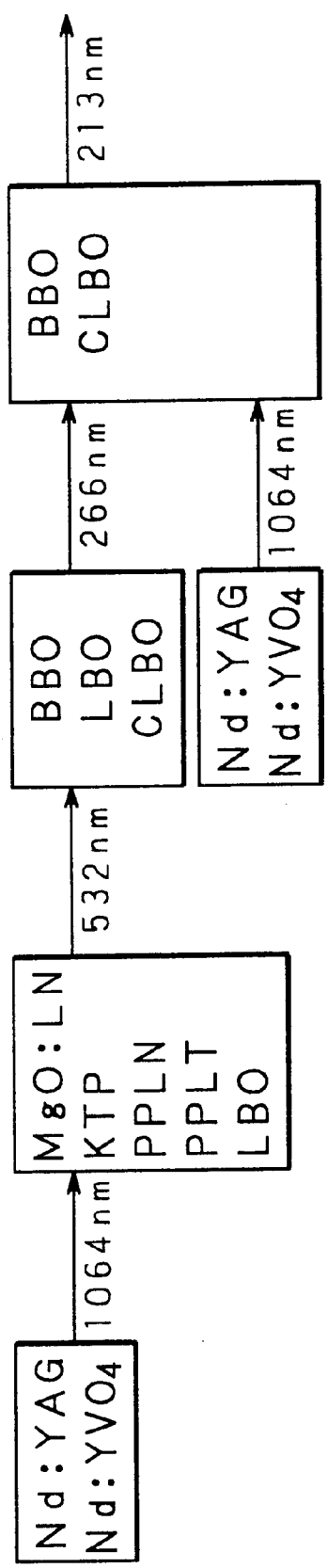
FIG. 10 shows an illustrative fourth technique of producing the ultraviolet laser light by wavelength conversion on harmonics generation or sum frequency generation.

FIG. 10 shows a fourth illustrative technique. In this technique, second harmonics with the wavelength λ=532 nm are generated, using MgO:LN, KTP, PPLN, PPLT or LBO, from the oscillating light of the wavelength A =1064 nm from the Nd:YAG laser or the Nd:YVO4 laser. The light with the wavelength λ=532 nm is introduced into an external resonant optical resonator employing BBO, LBO or CLBO to generate second harmonics. This generates the ultraviolet laser light with the wavelength λ=266 nm. This ultraviolet laser light with the wavelength λ=266 nm and the oscillated light with the wavelength λ=1064 nm from the Nd:YAG laser or the Nd:YVO$_4$ laser are introduced into an external resonant optical resonator employing BBO or CLBO to generate the sum frequency. This generates the ultraviolet laser light with the wavelength λ=213 nm.

Figure 11:
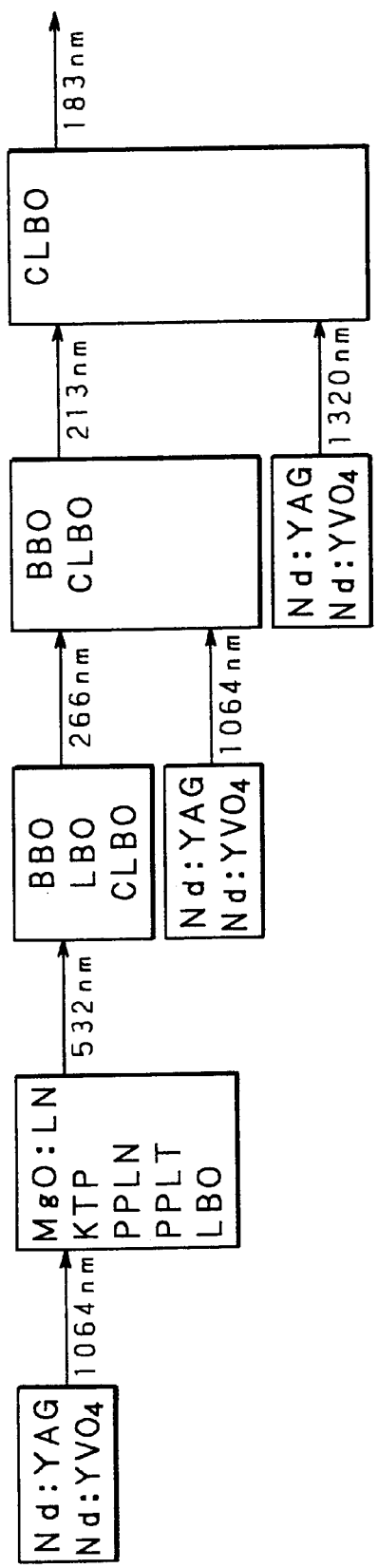
FIG. 11 shows an illustrative fifth technique of producing the ultraviolet laser light by wavelength conversion on harmonics generation or sum frequency generation.

FIG. 11 shows a fifth illustrative technique. In this technique, second harmonics with the wavelength λ=532 nm are generated, using MgO:LN, KTP, PPLN, PPLT or LBO, from the oscillating light of the wavelength λ=1064 nm from the Nd:YAG laser or the Nd:YVO$_4$ laser. The light with the wavelength λ=532 nm is introduced into an external resonant optical resonator employing BBO, LBO or CLBO to generate second harmonics. This generates the ultraviolet laser light with the wavelength λ=266 nm. This ultraviolet laser light with the wavelength λ=532 nm and the oscillated light with the wavelength λ=1064 nm from the Nd:YAG laser or the Nd:YVO$_4$ laser are introduced into an external resonant optical resonator employing CLBO to generate the sum frequency. This generates the ultraviolet laser light with the wavelength λ=213 nm. The ultraviolet laser light with the wavelength λ=213 nm and the oscillated light with the wavelength λ=1320 nm are introduced into an external resonant optical resonator employing CLBO to generate the sum frequency. This generates the ultraviolet laser light with the wavelength λ=183 nm.

Figure 12:
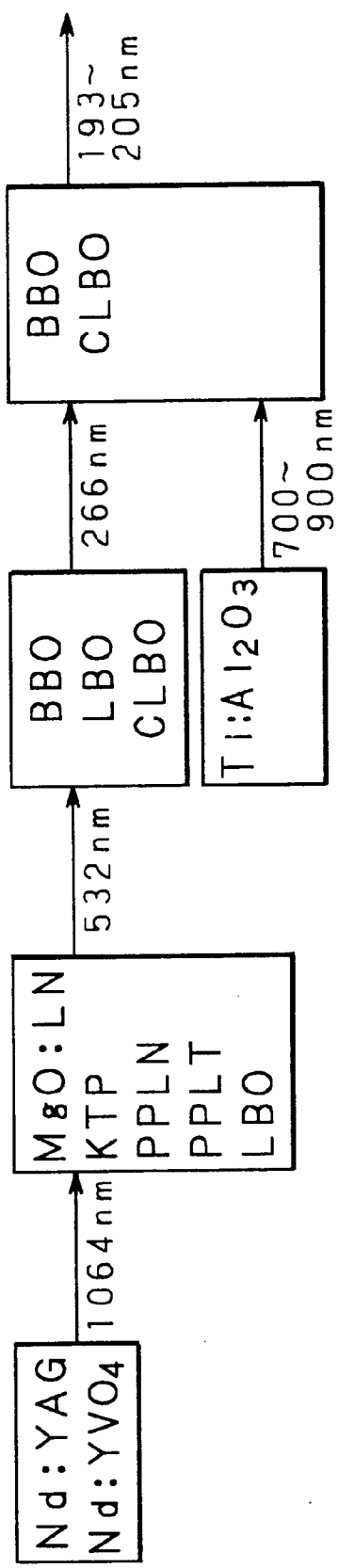
FIG. 12 shows an illustrative sixth technique of producing the ultraviolet laser light by wavelength conversion on harmonics generation or sum frequency generation.

FIG. 12 shows a sixth illustrative technique. In this technique, second harmonics with the wavelength λ=532 nm are generated, using MgO:LN, KTP, PPLN, PPLT or LBO, from the oscillating light of the wavelength λ=1064 nm from the Nd:YAG laser or the Nd:YVO$_4$ laser. The light with the wavelength λ=532 nm is introduced into an external resonant optical resonator employing BBO, LBO or CLBO to generate second harmonics. This generates the ultraviolet laser light with the wavelength λ==266 nm. This ultraviolet laser light with the wavelength λ=532 nm and the oscillated light of approximately 700 to 900 nm from a variable wavelength laser such as Ti:Al$_2$O$_3$ are introduced into an external resonant optical resonator employing BBO or CLBO to generate the sum frequency. This generates the ultraviolet laser light with the wavelength λ=193 to 205 nm.

Figure 13:
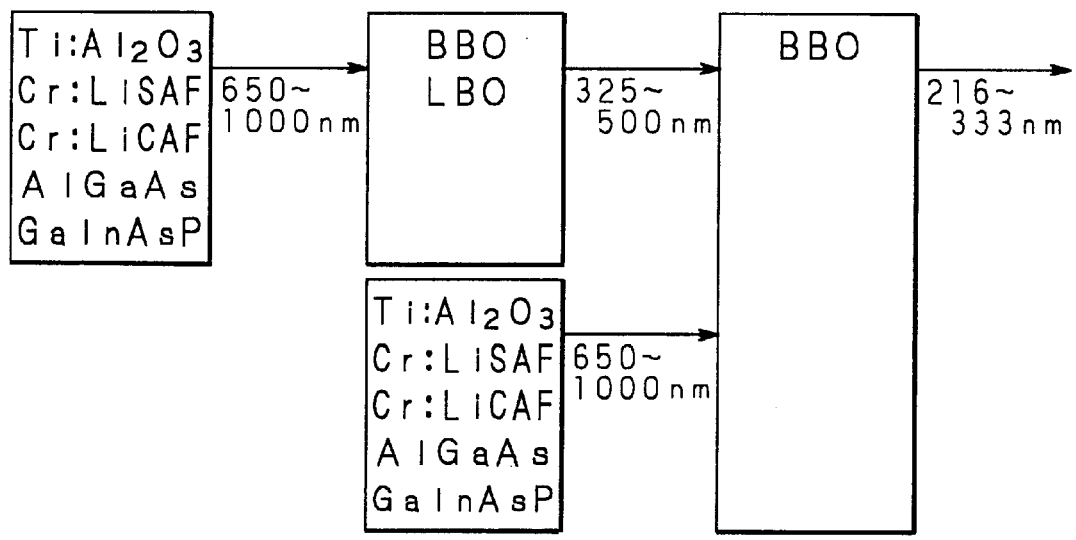
FIG. 13 shows an illustrative seventh technique of producing the ultraviolet laser light by wavelength conversion on harmonics generation or sum frequency generation.

FIG. 13 shows a seventh illustrative technique. In this illustrative technique, the laser light with the wavelength λ=650 to 1000 nm is oscillated by Ti:Al$_2$O$_3$ laser, Cr:LiSAF laser, Cr:LiCAF laser, AlGaAs laser or GaInAsP laser. This laser light is introduced into an external resonant optical resonator employing BBO or LBO to generate second harmonics. This generates the laser light with the wavelength λ=325 to 500 nm. This laser light and the laser light with the wavelength λ=650 to 1000 nm from the Ti:Al$_2$O$_3$ laser, Cr:LiSAF laser, Cr:LiCAF laser, AlGaAs laser or GaInAsP laser are introduced into an external resonant optical resonator employing BBO to generate a sum frequency. This generates the ultraviolet laser light having the wavelength λ=216 to 333 nm.

Figure 14:
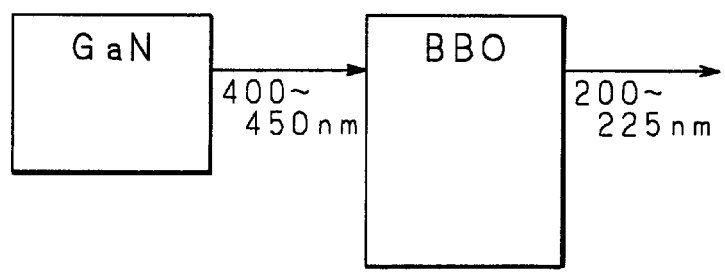
FIG. 14 shows an illustrative eighth technique of producing the ultraviolet laser light by wavelength conversion on harmonics generation or sum frequency generation.

FIG. 14 shows an eighth illustrative technique. In this illustrative technique, the laser light with the wavelength λ=400 to 450 nm is oscillated by a GaN laser. This laser light is introduced into an external resonant optical resonator employing BBO to generate second harmonics. This generates ultraviolet laser light with the wavelength λ=200 to 225 nm.

Figure 15:
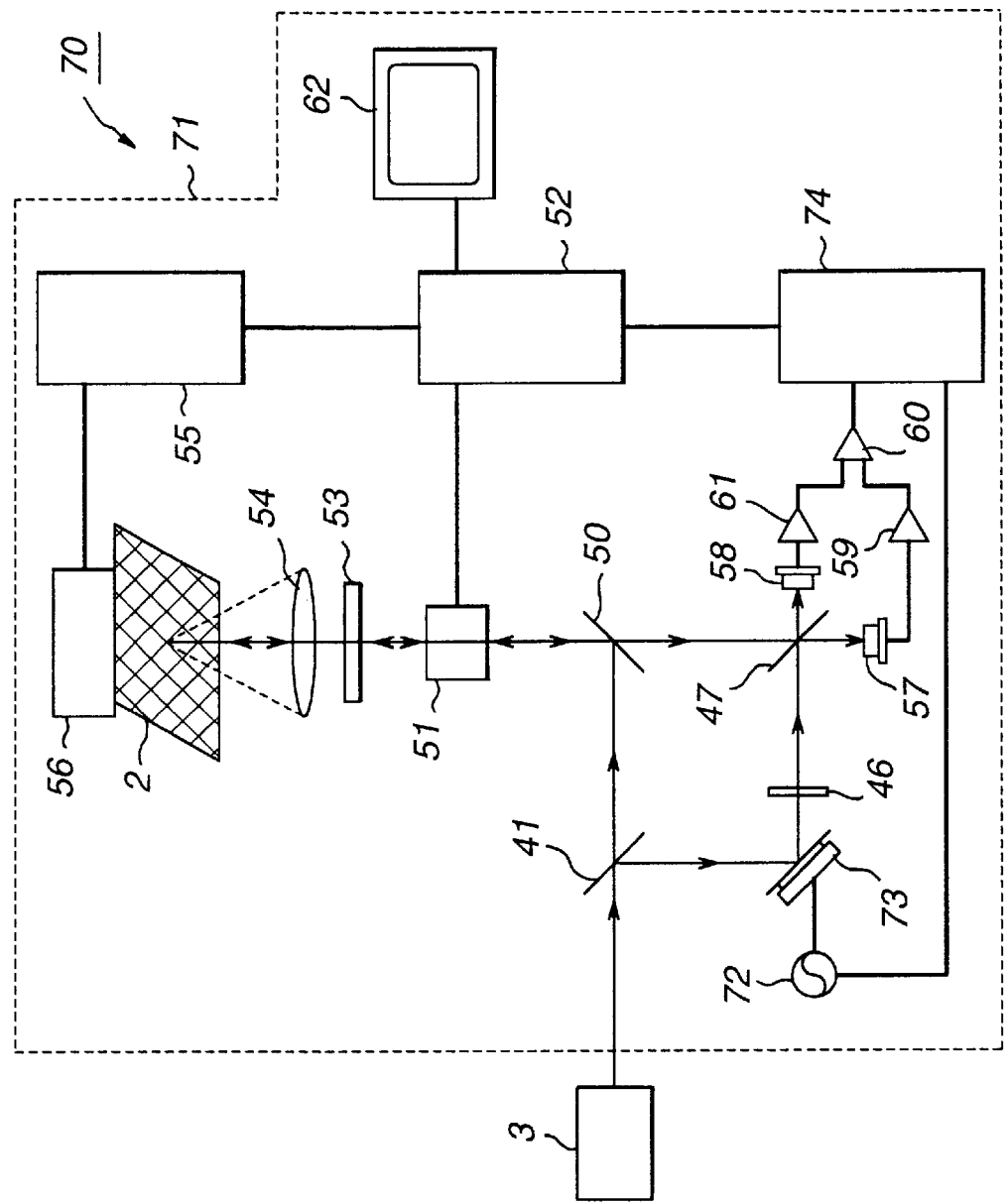
FIG. 15 shows an illustrative measuring device for measuring the structure of an object for measurement by heterodyne detection according to the present invention.

2. Measurement Device for Measuring the Structure of an Object for Measurement by Homodyne Detection FIG. 15 shows an illustrative measurement device 70 for measuring the structure of an object for measurement by homodyne detection. Similarly to the measurement device 1, this measurement device 70 is able to measure an extremely micro-structured structure and is useful for inspecting the micro-structured device. Similarly to the measurement device 1, this measurement device 70 is of the non-contact type and does not inflict damages to the object for measurement 2 so that it is useful for use in observing a living body liable to damages.

The measurement device 70 differs from the measurement device 1 in making homodyne detection with the ultraviolet laser light being shifted in phase, without making heterodyne detection with the ultraviolet laser light being shifted in frequency. In other respects, the measurement device 70 is similar to the measurement device 1. Therefore, parts or components similar to the of the measurement device 1 are depicted by the same reference numerals without making corresponding description and only parts or components different from those of the measurement device 1 are explained in detail.

Referring to FIG. 15, showing the measurement device 70, the ultraviolet laser light radiated form the ultraviolet light generating unit 3 falls on a homodyne detection unit 71 adapted to measure the structure of the object for measurement 2 by homodyne detection employing the ultraviolet laser light. The ultraviolet laser light radiated by the ultraviolet light generating unit 3 to fall on the homodyne detection unit 71 is split by light splitting unit 41 into reference light and detection light.

The reference light is incident on a phase shifter 73 driven by a phase shifter driving unit 72 for phase shifting. The phase shifter driving unit 72 drives the phase shifter 73 based on a control signal from a homodyne signal processing unit 74. The reference light is incident on the phase shifter 73 driven by the phase shifter 73 and thereby shifted in phase in a pre-set fashion. The reference light, thus phase-shifted by the phase shifter 73, is incident on and passed through the half wave plate 46 so as to fall on a combining mirror 47.

Such phase shifter 73 is desirable which is comprised of an actuator driven by driving signals from the phase shifter driving unit 72 and which is fitted with a light reflecting mirror. Specifically, a light reflecting mirror is arranged on an optical path of the reference light, and the position of the light reflecting mirror is precisely controlled by an electromagnetic actuator, such as an piezoelectric actuator formed of PZT or a voice coil meter, to phase-shift the reference light.

On the other hand, the detection light is reflected by a polarization beam splitter 50 to fall on the object for measurement 2 via a beam deflection unit 51, a quarter wave plate 53 and an object lens 54. The return light falls on the combining mirror 47 via the object lens 54, quarter wave plate 53, beam deflection unit 51 and the polarization beam splitter 50.

The combining mirror 47 is used for superposing the return light from the object for measurement 2 and the reference light, and is made up of a half mirror. On one surface of the combining mirror 47 is incident the phase-shifted reference light. On the opposite side surface of the combining mirror 47 is incident the return light of the detection light reflected back from the object for measurement 2. The reference light reflected by the combining mirror 47 and the return light transmitted through the combining mirror 47 are superimposed and incident on a photodetector 57 for detection. Also, the reference light transmitted through the combining mirror 47 and the return light reflected by the combining mirror 47 are superimposed and incident on the photodetector 58 for detection.

An output of the photodetector 57 is amplified by an amplifier 59 and inputted to a comparator 60. Similarly, an output from the other photodetector 58 is amplified by an amplifier 61 and inputted to the comparator 60. The comparator 60 takes the difference between the outputs of the photodetectors 57, 58. This difference signal is inputted to a homodyne signal processing unit 74 for detection of a homodyne signal containing the phase information.

The input signal of the homodyne signal processing unit 74 is processed thereby such as with synchronous detection for retrieving the light intensity information and the phase information. This information is sent to the image controller 52 for image processing so that an image indicating the measured results of the structure of the object for measurement 2 is displayed on a image display unit 62.

With the measurement device 70, adapted for measuring the structure of the object for measurement 2 by homodyne detection, the micro-structured structure of the submicron order can be measured as in the case of the measurement device 1. Moreover, since the structure of the object for measurement 2 is measured optically, the structure can be inspected in a non-contact and non-destructive fashion under atmospheric environment.

Figure 16:
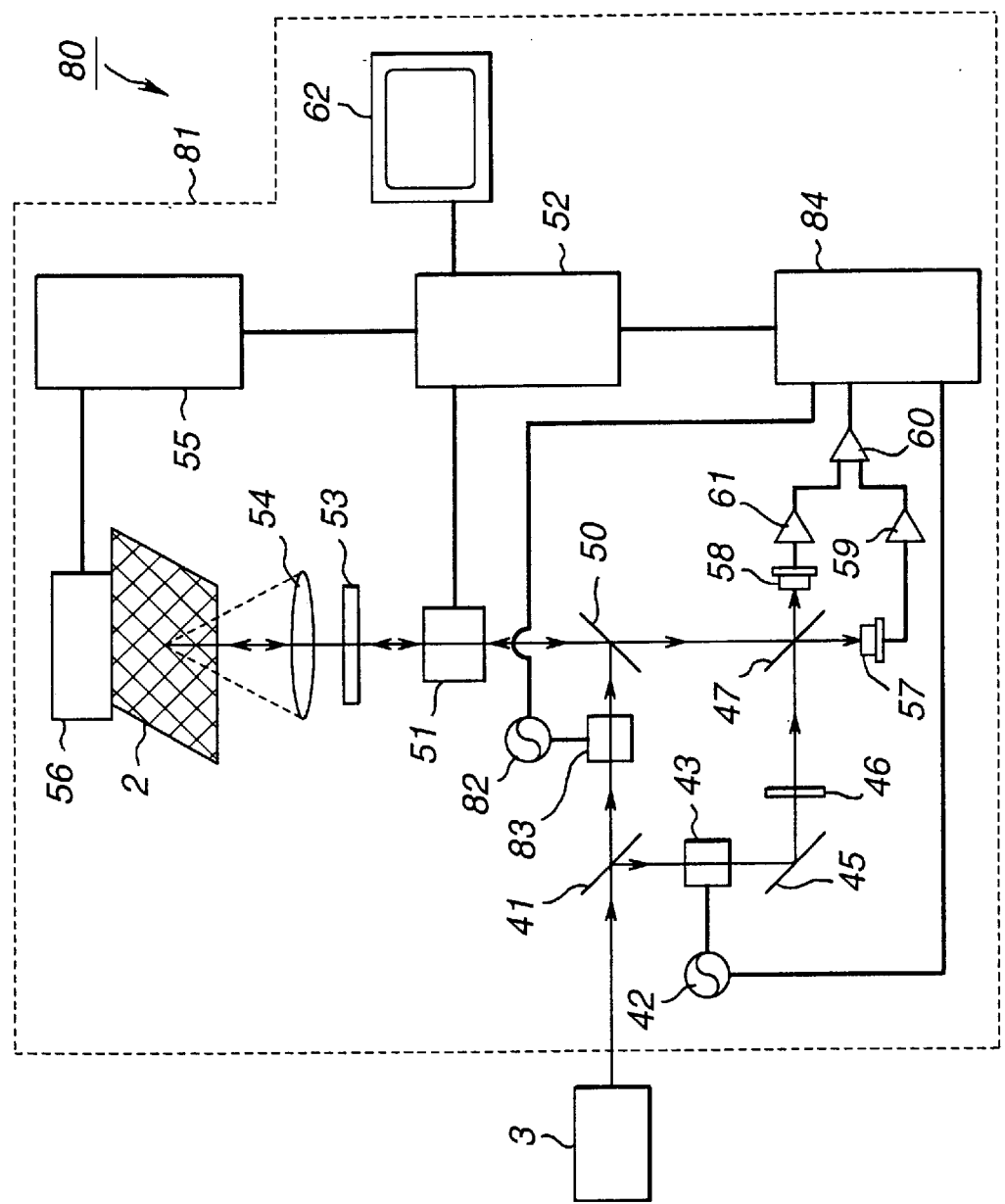
FIG. 16 shows an illustrative measuring device for measuring the structure of an object for measurement by heterodyne detection by forming images of the laser light at different focal point positions.

3. Measurement Device for Heterodyne Detection with the Laser Light being Imaged at Different Focal Point Positions FIG. 16 shows an illustrative measurement device adapted for measuring the structure of an object for measurement by heterodyne detection with the laser light being imaged at different focal point positions. This measurement device 80 is able to measure the structure of the object for measurement 2 not only in the planar direction but also along the depth simultaneously. Similarly to the measurement device 1, the present measurement device 80 is able to measure an extremely micro-structured structure, and hence is useful for inspecting the micro-structured device. Also, the measurement device 70, similarly to the measurement device 1, is of the non-contact type and does not inflict damages on the object for measurement 2. Therefore, the measurement device 80 is useful in observing a living body susceptible to damages.

3-1 Structure of the Measurement Device

The measurement device 80 differs from the measurement device 1 in turning the ultraviolet laser light into multiple beams which are imaged at different focal point positions. Otherwise, the measurement device 80 is similar to the measurement device 1. Thus, in the following description, the parts or components constructed similarly to those of the measurement device 1 are depicted by the same reference numerals and are not explained specifically, while those parts or components different in structure from those of the measurement device 1 are explained in detail.

In the present measurement device 80, the ultraviolet laser light radiated by the ultraviolet light generating unit 3 falls on a heterodyne measurement unit 81 adapted for measuring the structure of the object for measurement 2 by heterodyne detection employing the ultraviolet laser light. The ultraviolet laser light radiated from the ultraviolet light generating unit 3 to be incident on the heterodyne measurement unit 81 is split by the light splitting unit 41 into the reference light and the detection light.

The reference light is incident on the frequency shifter 43 driven by the frequency shifter driving unit 42 and thereby processed with frequency shifting. The reference light, shifted in phase by the frequency shifter 43, is incident on and transmitted through the half wave plate 46 before being incident on the combining mirror 47.

On the other hand, the detection light is incident on a multiple beam forming unit 83 driven by a multiple beam forming unit driving circuit 82 and thereby turned into multiple beams. The driving circuit 82 derives the multiple beam forming unit 83 based on a control signal from a heterodyne signal processing unit 84. The detection light incident on the multiple beam forming unit 83 driven by the driving circuit 82 is split into multiple light beams on the same optical axis having different frequencies. The detection light split into multiple light beams with different frequencies is incident on and reflected by the polarization beam splitter 50 to fall on the object for measurement 2 via the beam deflection unit 51, quarter wave plate 53 and the object lens 54. The object lens 54 causes the respective light beams to be formed by the multiple beam forming unit 83 at respective different focal point positions. Specifically, the object lens 54 forms the images of the respective light beams with a slight shift from one another along the direction of the optical axis, that is in the depth-wise direction of the object for measurement 2.

The return light, comprised of these respective light beams, reflected back from the object for measurement 2, are incident on the combining mirror 47 via the object lens 54, quarter wave plate 53, beam deflection unit 51 and the polarization beam splitter 50.

The combining mirror 47 is used for superimposing the return light from the object for measurement 2 and the reference light and is made up of a half mirror. On one surface of the combining mirror 47 is incident the phase-shifted reference light. On the opposite side surface of the combining mirror 47 is incident the return light of the detection light reflected back from the object for measurement 2. The reference light reflected by the combining mirror 47 and the return light transmitted through the combining mirror 47 are superimposed and incident on a photodetector 57 for detection. Also, the reference light transmitted through the combining mirror 47 and the return light reflected by the combining mirror 47 are superimposed and incident on the photodetector 58 for detection.

An output of the photodetector 57 is amplified by an amplifier 59 and inputted to a comparator 60. Similarly, an output from the other photodetector 58 is amplified by an amplifier 61 and inputted to the comparator 60. The comparator 60 takes the difference between the outputs of the photodetectors 57, 58. The difference signal is inputted to a heterodyne signal processing unit 84 for detection of a heterodyne signal containing the phase information.

The input signal to the heterodyne signal processing unit 84 is processed thereby such as with synchronous detection for retrieving the light intensity information and the phase information. The heterodyne signal processing unit 84 separates the frequency bands of the heterodyne signals to retrieve the information associated with the respective imaging points of the respective light beams formed by the multiple beam forming unit 83. This information is sent to the image controller 52 for image processing so that a image indicating the measured results of the structure of the object for measurement 2 is displayed on a image display unit 62.

3-2 Principle of Measurement Device

In the measurement device 80, the structure of the object for measurement 2 along its depth can also be measured by turning the detection light into multiple beams and by slightly shifting the imaging positions along the depth of the object for measurement 2 to enable formation of a three-dimensional image of the object for measurement 2. The underlying principle will be hereinafter explained.

In general, a cofocal microscope has a shallow depth of focus, such that, by mechanically shifting the focal point positions, different images associated with the respective focal point positions can be obtained and, by synthesizing these images, a three-dimensional image may be produced. However, mechanically moving the focal point positions is time-consuming and hence this method is not suited for an application in need of a high throughput, such as the in-line inspection of the micro-structured device. On the other hand, if the object for measurement is movable, such as in case of a living body, the position of the object for measurement tends to be moved during movement of the focal point positions to render it difficult to produce a three-dimensional image.

If the object for measurement is scanned simultaneously with multiple light beams having slightly different focal point positions, it becomes possible to produce a three-dimensional image of the object for measurement in real-time. However, the respective light beams are coaxially arranged to render it difficult to separate the respective light beams on the photodetector. Although it may be contemplated to shift the focal point positions along a direction orthogonal to the optical axis to permit the light beams to be detected by multiple photodetectors. However, in order to provide an arrangement free of cross-talk between the respective light beams, the separation between the respective light beams needs to be set to a larger value, thus raising the problem that the object cannot be measured in real time or that the number of light beams cannot be increased within the limited field of view of the object lens.

Figure 17:
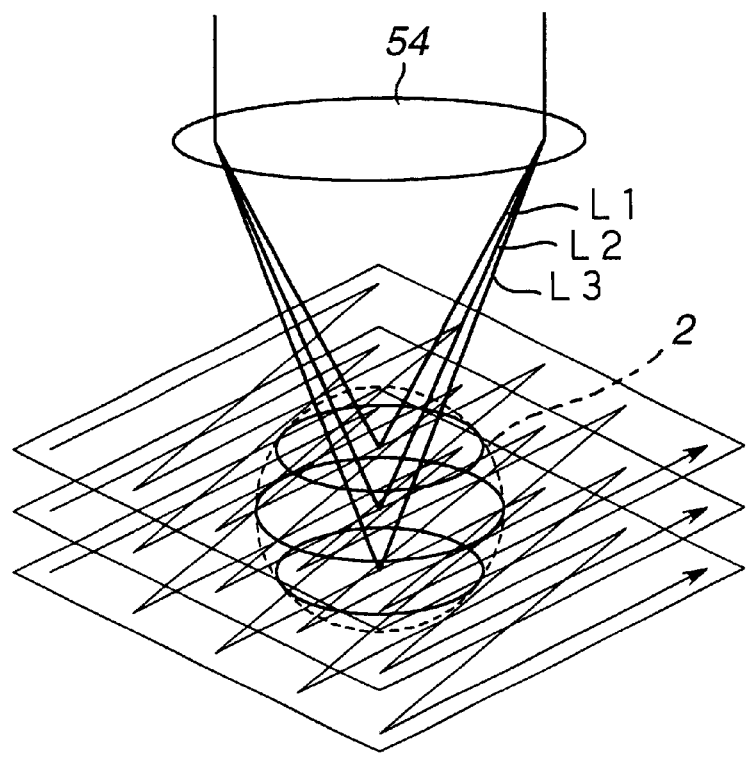
FIG. 17 shows how the images of the multiple light beams are formed at different focal point positions by the object lens.

Conversely, with the measurement device 80, the information obtained on the respective light beams can be separated from one another on account of heterodyne detection. That is, the detection light converged by the object lens 54 is turned into multiple beams to produce multiple light beams L1, L2, L3, . . . having slightly different focal positions, so that the respective light beams are subjected to different frequency shifting, as shown in FIG. 17. In such case, the heterodyne signals detected by the photodetectors 57, 58 are respective different signals, so that reproduced signals free of cross-talk can be obtained from one light beam to another by frequency band separation.

For example, if the differences in the frequency between the respective light beams L1, L2, L3, . . . and the reference light are denoted as f1, f2, f3, . . . , where f1=12 MHz, f2=24 MHz and f3=36 MHz, . . . , and the frequency band of the heterodyne signals detected by the respective light beams is 5 MHz, the respective heterodyne signals can be separated using frequency filters having the bands of 5 MHz around f1, f2, f3, . . . as center, even if the respective light beams are received and detected by the same photodetectors 57, 58.

With the measurement device 80, the structure of the object for measurement 2 can be measured in a direction along the depth of the object for measurement 2 to enable a three-dimensional image of the object for measurement 2 to be produced in real time.

Meanwhile, this signal separation is effective not only when the focal point positions are shifted in the direction along the optical axis, but also when the focal point positions are shifted in a direction normal to the optical axis (transverse direction) or when the focal point positions are shifted both along the optical axis and in the transverse direction. Although the light beams are adjacent to one another in such case, it is possible to remove the cross-talk between the neighboring light beams by separating the signals in accordance with the above-described principle. That is, if the neighboring light beams are in overlapped positions, the respective signals can be separated by the above-described principle to eliminate the cross-talk between the respective light beams. In particular, if a light beam is arranged for each Airy radius of the light spot ($0.6 \times \lambda/NA$), it is the points corresponding to the light spot intensity equal to 0 that are sampled in the case of an ideal Gauss beam, so that an image can be restored within the spatial frequency response as determined by the light spot diameter based on the sampling theorem.

This principle of signal separation can be utilized even in the field other than the measurement of the micro-structured structure. Specifically, the above-described principle of signal separation can be applied to three-dimensional recognition employing the laser light or signal reproduction from an optical disc carrying the information along the direction of thickness. If a telescope is used in combination, the above principle can be applied to three-dimensional recognition of, for example, an aircraft flying in air. It may also be envisaged to apply the principle to application to prevention of car collision by exploiting the three-dimensional recognition.

3-3 Multiple Beam Forming Means

A specified illustrative structure of the multiple beam forming unit 83 used in the measurement device 80 is further explained in detail.

Meanwhile, the separation of heterodyne signals is effective not only if the focal point positions are shifted in a direction along the optical axis but also if the focal point positions are shifted both along the optical axis and in the transverse direction, as described above. Specified examples of the multiple beam forming unit 83, such as those used when the focal point positions are shifted along the direction of the optical axis or those used when the focal point positions are shifted along the optical axis and in the transverse direction simultaneously, are hereinafter explained.

It is assumed that, if the focal point positions are shifted in the direction along the optical axis, the multiple beam forming unit 83 splits the incident laser light into multiple light beams of different frequencies on the same optical axis, while setting different positions of the virtual beam radiating positions. If the focal point positions are shifted in the transverse direction, the multiple beam forming unit 83 splits the multiple light beams of different frequencies in the transverse direction. Also, if the focal point positions are shifted in the optical axis direction and in the transverse direction in combination, the multiple beam forming unit 83 splits the incident laser light in the transverse direction into multiple light beams of different frequencies, while setting different virtual beam light emitting positions. The multiple beam forming unit 83 will be explained hereinbelow in detail.

Figure 18:
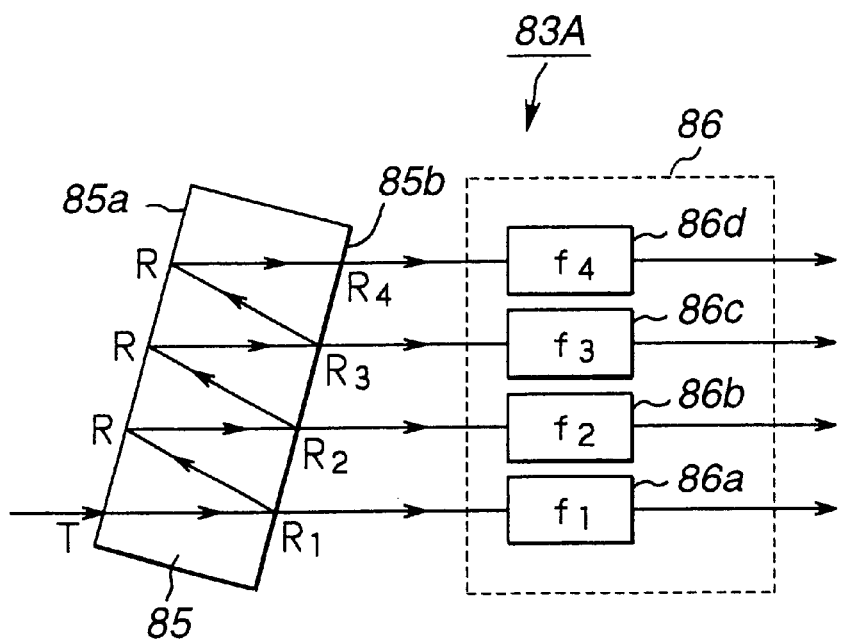
FIG. 18 shows a first embodiment of multi-beam forming means.

FIG. 18 shows a first illustrative structure of the multiple beam forming unit 83. Specifically, FIG. 18 shows a multiple beam forming unit 83A configured for splitting the incident laser light into four parallel light beams. The multiple beam forming unit 83A splits the incident laser light into four parallel light beams, and includes an optical block 85, having respective opposite surfaces arranged as mirrors, as light splitting means for splitting the incident laser light into multiple light beams, and a frequency shifting unit 86 for frequency shifting the respective light beams so that the respective light beams split by the optical block 85 will be of different frequencies.

In the above optical block 85, light transmittance T of a laser light inlet point of the light incident side mirror 85a is set to substantially 100%, while light reflectance R of the remaining portion of the mirror 85a is set to approximately 100%. As for the light outgoing side mirror surface 85b, if the light reflectance values for the first reflection, second reflection, third reflection and the fourth reflection are set to R1, R2, R3 and R4, respectively, the following equations: $1-R2=(1-R1)/R1$, $1-R3=(1-R1)/(R1 \times R2)$, $1-R4=(1-R1)/(R1 \times R2 \times R3)$ are set. The reflectance R4 for the fourth reflection is set to approximately 0%. Meanwhile, the setting of the light transmittance T and the light reflectances R, R1 to R4 is realized by applying differential coating on the respective pertinent sites of the optical block 85.

If the laser light is split by the optical block 85 into multiple light beams, the laser light is adapted to fall obliquely on the light incident side mirror 85a of the optical block 85. Since the light transmittance T of the laser light inlet point of the optical block 85a is substantially 100%, substantially 100% of the laser light is incident on the optical block 85.

The laser light incident on the optical block 85 is first reflected by the light outgoing side mirror surface 85b. At this time, the light outgoing side mirror surface 85b in the laser light incident site has a pre-set reflectance R1. Thus, a portion of the laser light is reflected by the light outgoing side mirror surface 85b towards the light incident side mirror 85a, with the remaining portion of the laser light being transmitted through the light outgoing side mirror surface 85b to be emitted via the optical block 85.

The laser light reflected by the site with the reflectance R1 is incident on and reflected by the light incident side mirror 85a to be again incident on and reflected by the light outgoing side mirror surface 85b. The light outgoing side mirror surface 85b at the laser light incident site has the pre-set reflectance R2. Thus, a portion of the laser light is reflected by the light outgoing side mirror surface 85b towards the light incident side mirror 85a, with the remaining portion being transmitted through the light outgoing side mirror surface 85b to exit the optical block 85.

The laser light reflected by a site with the reflectance R2 is incident on and reflected by the light incident side mirror 85a so as to be again incident on and reflected by the light outgoing side mirror surface 85b. At this time, the light outgoing side mirror surface 85b at the laser light incident site is of a pre-set reflectance R3. Thus, a portion of the laser light is reflected by the light outgoing side mirror surface 85b towards the light incident side mirror 85a, with the remaining portion being transmitted through the light outgoing side mirror surface 85b to exit the optical block 85.

The laser light reflected by the site with the reflectance R3 is incident on and reflected by the light incident side mirror 85a so as to be again incident on the light outgoing side mirror surface 85b. At this time, the reflectance R4 of the laser light incident site of the light outgoing side mirror surface 85b is substantially 0%, so that the laser light is transmitted through the light outgoing side mirror surface 85b to exit the optical block 85.

By the repetition of the reflection and transmission as described above, the laser light incident on the optical block 85 is split so that four collimated light beams of approximately equal light intensity are radiated from the light outgoing side mirror surface 85b.

The respective light beams, split by the optical block 85, are frequency shifted by a frequency shifting unit 86 so as to have different frequencies.

The frequency shifting unit 86 includes a first frequency shifter 86a, associated with a first light beam split by the optical block 85, a second frequency shifter 86b, associated with a second light beam split by the optical block 85, a third frequency shifter 86c, associated with a third light beam split by the optical block 85, and a fourth frequency shifter 86d, associated with a fourth light beam split by the optical block 85. These frequency shifters 86a to 86d correspond to the frequency shifter 49 of the measurement device 1.

The frequency shifters 86a to 86d are driven at different carrier frequencies f1 to f4 for applying frequency shifting in different amounts to the first to fourth light beams to produce four light beams of different frequencies.

Although the foregoing description is directed to splitting the incident laser light equally into four light beams, the power ratio or the number of times of splitting can be optionally set by suitably changing the number of times of reflection in the inside of the optical block 85 or the reflectance distribution of the light outgoing side mirror surface 85b. Although the foregoing description is directed to splitting the light beam using the optical block 85, it is also possible to split the light beam using a diffraction grating or a hologram element. For providing multiple beams in the transverse direction, multiple carrier signals may be applied to the acousto-optical modulator instead of providing the multiple beam forming unit 83.

Figure 19:
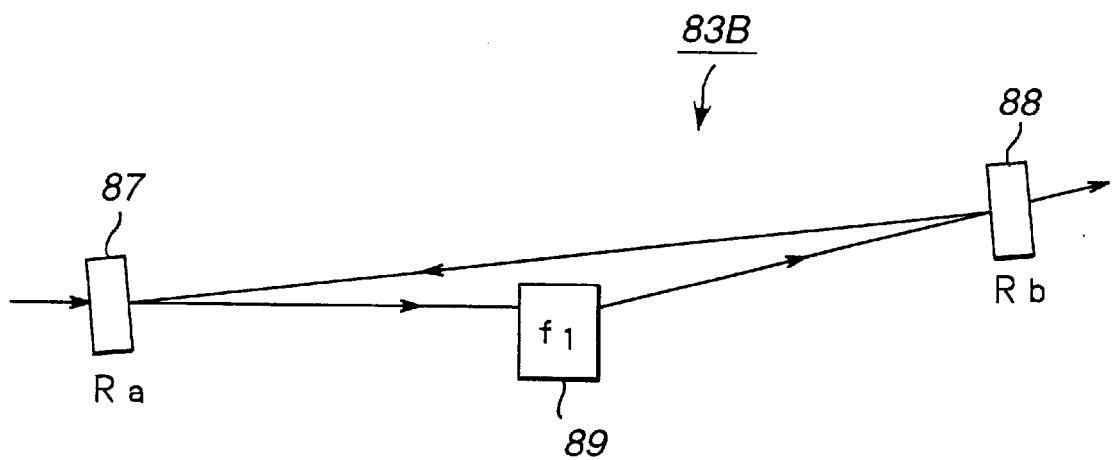
FIG. 19 shows a second embodiment of multi-beam forming means.

FIG. 19 shows a second illustrative structure of the multiple beam forming unit 83. Specifically, a multiple beam forming unit 83B of the second illustrative structure splits the incident laser light into multiple light beams of different frequencies on the same optical axis. As light splitting means for the incident laser light, there are provided a first mirror 87 having a pre-set reflectance Ra and a second mirror 88 of a pre-set reflectance Rb, arranged for facing the first mirror 87. The multiple beam forming unit 83B includes, as frequency shifting means for frequency shifting the light beam, a frequency shifter 89 arranged between the first mirror 87 and the second mirror 88.

For splitting the incident laser light by the multiple beam forming unit 83B into multiple light beams of different frequencies on the same optical axis, the laser light is caused to be incident from the side of the first mirror 87. This laser light is transmitted through the first mirror 87 to fall on the multiple beam forming unit 83B and, first of all, on the frequency shifter 89. At this time, the frequency shifter 89 is run at a pre-set carrier frequency f1. This frequency shifts the laser light in an amount corresponding to the carrier frequency f1.

The frequency-shifted laser light is incident on the second mirror 88. If the frequency shifter 89 is constituted by an acousto-optical modulator, the first-order diffracted light by the acousto-optical modulator falls on the second mirror 88. A portion of the laser light incident on the second mirror 88 is transmitted therethrough to exit from the multiple beam forming unit 83B, with the remaining laser light being reflected towards the first mirror 87. The first and second mirrors 87, 88 are angularly adjusted so that the reflected light by the second mirror 88 will be returned to the first mirror 87. The laser light reflected by the second mirror 88 and returned to the first mirror 87 is reflected thereby to fall again on the frequency shifter 89 for frequency shifting.

By the repetition of reflection between the first and second mirrors 87, 88 and frequency shifting by the frequency shifter 89, multiple light beams of different frequencies are produced on the same optical axis. Specifically, the light beam exiting after traversing the frequency shifter 89 once and transmission through the second mirror 88 is frequency shifted in an amount corresponding to the carrier frequency f1 of the frequency shifter 89, while the light beam exiting after traversing the frequency shifter 89 twice and transmission through the second mirror 88 is frequency shifted in an amount corresponding to twice the carrier frequency f1 of the frequency shifter 89, and the light beam exiting after traversing the frequency shifter 89 thrice and transmission through the second mirror 88 is frequency shifted in an amount corresponding to thrice the carrier frequency f1 of the frequency shifter 89. In a similar manner, the light beam exiting after traversing the frequency shifter 89 n times and transmission through the second mirror 88 is frequency shifted in an amount corresponding to n times the carrier frequency f1 of the frequency shifter 89. That is, with the multiple beam forming unit 83B, it is possible to produce multiple light beams on the same optical axis having frequencies different in amounts corresponding to integer number times the carrier frequency f1 of the frequency shifter 89.

If, in the multiple beam forming unit 83B, divergent light is used in place of the collimated light as the laser light incident on the first mirror 87, virtual beam light emitting positions are shifted towards rear each time the laser light is reflected between the first and second mirrors 87, 88. That is, if the laser light incident on the first mirror 87 is the divergent light, the virtual beam light emitting positions are shifted towards rear in an amount equal to 2×L, L being an optical path length between the first and second mirrors 87, 88, each time the laser light is reflected between the first and second mirrors 87, 88.

If this light beam is imaged by the object lens 54, the respective light beams, having different frequencies, are focussed at different points. That is, the focal point positions are shifted in an amount of $\Delta=(fp2/fp1)^2 \times 2 \times L$ each time the virtual be light emitting position is shifted by 2×L towards rear, so that the imaging positions of the respective light beams having different frequencies become different respectively.

Meanwhile, the amount of shift of the virtual beam light emitting positions, produced each time the laser light undergoes reflection between the first and second mirrors 87, 88, can be adjusted by according desired curvatures to the first and second mirrors 87, 88 or by inserting a lens into an optical path between the first and second mirrors 87, 88. Thus, by changing moderate curvatures to the first and second mirrors 87, 88 or by inserting a lens into an optical path between the first and second mirrors 87, 88, the shift in the focal point positions Δ produced on imaging the light beams split by the multiple beam forming unit 83B by the object lens 54 can be adjusted optionally.

Meanwhile, this shift in the focal point positions can similarly be produced by the multiple beam forming unit 83A shown in FIG. 18. That is, if, in the multiple beam forming unit 83A shown in FIG. 18, divergent light is used in place of the collimated light as the incident laser light, the virtual beam light emitting position is shifted towards rear each time the laser light reflected in the optical block 85, so that, if the light beams are imaged by the object lens 54, the spacing between the object lens 54 and the object lens 54 differs from one light beam to another.

3-4 Detection of Multiple Beam in Measuring Device

In the measurement device 80, there is provided a multiple beam forming unit 83 between the light splitting unit 41 and the polarization beam splitter 50, as shown in FIG. 16, such that the detection light is split into multiple light beams on the same optical axis having multiple frequencies. These beams are converged by the object lens 54 on the object for measurement 2. It is noted that these light beams are imaged with the respective focal point positions slightly shifted in a direction along the depth of the object for measurement 2. The return light of these light beams, reflected by the object for measurement 2, is detected by the photodetectors 57, 58.

It is noted that the reference light also is incident simultaneously on the photodetectors 57, 58. This reference light is configured so that it is nearly the collimated light with a shallow light collecting angle so that the focal points of the return light beams on the photodetectors 57, 58 will be included in the focal point range of the reference light, with the reference light being spatially coincident with the return light. Stated differently, the spot diameters of the reference light on the photodetectors 57, 58 are set so as to be slightly larger, with the light converging position of the return light coinciding with that of the reference light, the reference light spatially covering the return light.

The outputs of the photodetectors 57, 58 are inputted to the heterodyne signal processing unit 84 via amplifiers 59, 61 and the comparator 60 and separated by the heterodyne signal processing unit 84 into respective frequency bands, to retrieve heterodyne signals associated with the respective imaging points of the light beams formed by the multiple beam forming unit 83.

In turning the laser light into multiple beams, not only the detection light but also the reference light can be turned into multiple beams. If the reference light also is turned into multiple beams, it is frequency shifted by the frequency shifter 43 and subsequently split into multiple light beams by a multiple beam forming unit not having the frequency shifter. The multiple detection light beams having different frequencies and the multiple reference light beams having the equal frequency are used to effect heterodyne detection. In this case, the respective focal point positions of the return light beams and those of the reference light beams are adapted to be in register with one another to enable more efficient multi-beam detection.

By scanning the object for measurement 2 simultaneously by the frequency-separated multiple beams by way of heterodyne detection and separating the resulting heterodyne signals from one frequency band to another, the structure of the object for measurement 2 can be measured simultaneously from one imaging point of the light beam to another. If the imaging points of the respective light beams are set so as to be different along the depth of the object for measurement 2, it becomes possible to measure the structure of the object for measurement 2 along the depth-wise direction as well to render it possible to produce a three-dimensional image of the object for measurement 2 in real-time. If the detection light is formed into multiple beams, it is possible to measure multiple points of the structure of the object for measurement 2 simultaneously, so that the measurement time can be correspondingly reduced in case of producing a two-dimensional image as well.

Figure 21:
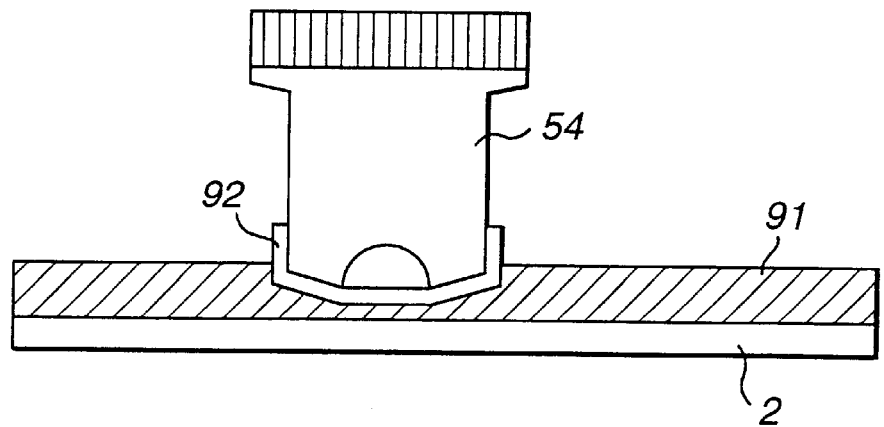
FIG. 21 shows the state of arraying the liquid between the object lens and the object for measurement.
Figure 20:
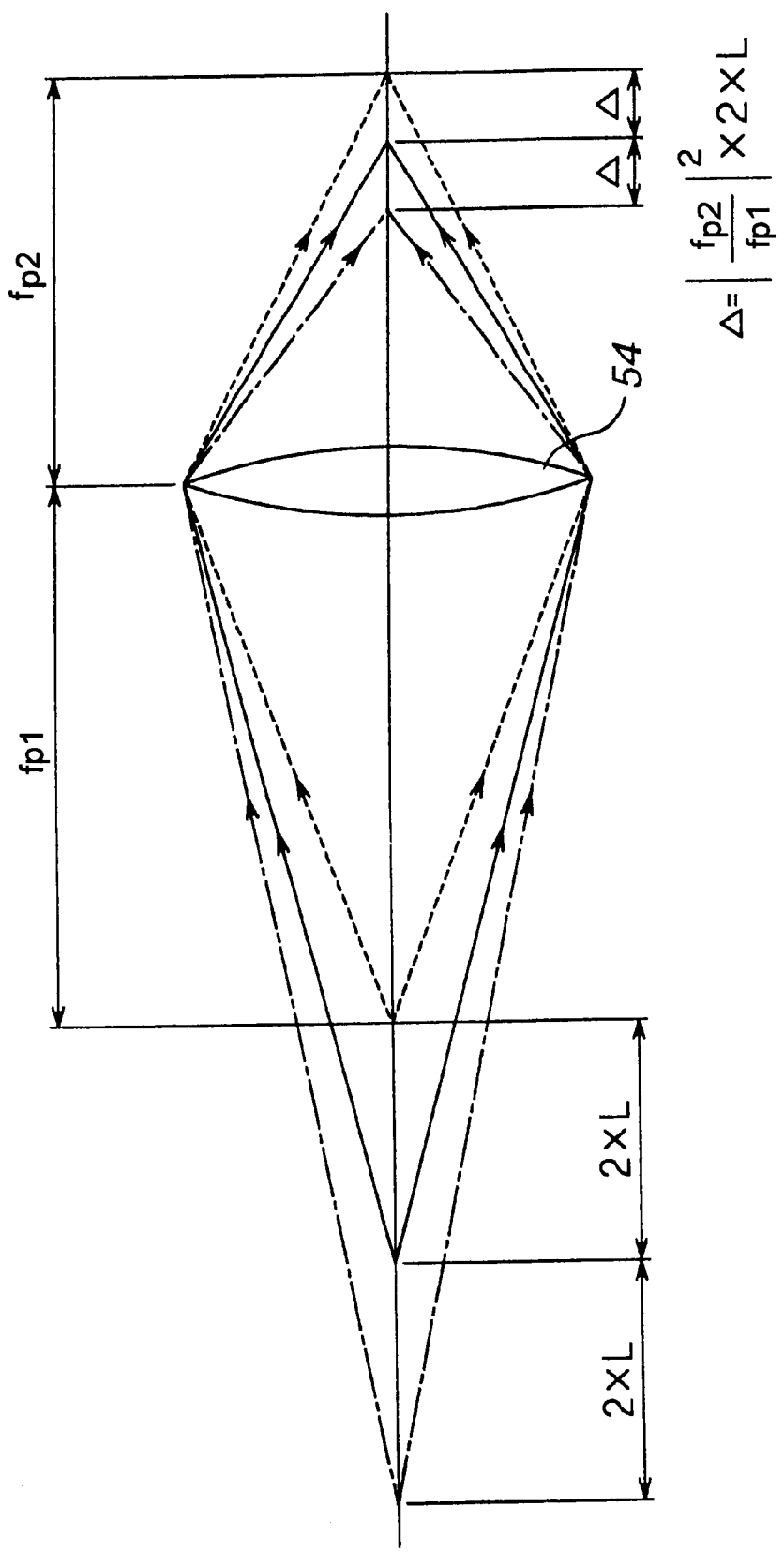
FIG. 20 the relation between the amount of shifting of an virtual beam-emitting position and an image-forming position of the light beam.

For measuring the structure of the object for measurement 2 using the measurement devices 1, 70 and 80, liquid 91 may be arranged between the object lens 54 and the object for measurement 2, as shown in FIG. 21.

If the object lens 54 is optimized with respect to the refractive index of the liquid 91 arranged between the object lens 54 and the object for measurement 2, the numerical aperture NA of the object lens 54 is increased in an amount corresponding to the refractive index of the liquid 91 to improve the resolution correspondingly. The refractive index of the liquid is usually of the order of 1.3 to 1.4, so that, if the liquid 91 is arranged between the object lens 54 and the object for measurement 2, the resolution is improved by a factor of 1.3 to 1.4 as compared to that for observation in atmosphere.

The liquid 91 arranged between the object lens 54 and the object for measurement 2 may be such a liquid as undergoes chemical reaction with the object for measurement 2. By using the liquid undergoing chemical reaction with the object for measurement 2, it is possible to measure changes in the structure of the object for measurement 2 caused by the chemical reaction.

By so doing, it is possible to measure changes in the structure caused by the etching or developing process during manufacture of the micro-structured device. That is, by employing an etching solution etching the object for measurement 2 as the liquid 91 arranged between the object lens 54 and the object for measurement 2, it is possible to measure changes in the structure of the object for measurement 2 during etching. Alternatively, by using a developing solution for developing a latent image formed on a photoresist, as liquid 91 arranged between the object lens 54 and the object for measurement 2, it is possible to measure changes in the structure of the object for measurement 2 during the developing process.

By arranging the liquid 91 between the object lens 54 and the object for measurement 2, it is possible to improve the resolution. Moreover, by using the developing or etching solution as the liquid 91, it is possible to observe the state of development of the photoresist by the developing solution or the state of etching of the object for measurement 2 by the etching solution. The result is that the manufacturing process for the micro-structured device can be optimized to improve the production yield further.

If the liquid undergoing chemical reaction with the object for measurement 2 is used as the liquid 91 arranged between the object lens 54 and the object for measurement 2, there are occasions wherein the lens surface of the object lens 54 is contaminated or deteriorated.

Therefore, if the liquid 91 is arranged between the object lens 54 and the object for measurement 2, it is desirable to provide an exchangeable protective cover 92 on the object lens 54 to protect the object lens 54 by the protective cover 92. The protective cover 92 is preferably formed of a member having high transmittance in the wavelength range of the detection light.

By using such protective cover 92, it is possible to avoid contamination or deterioration of the object lens 54 by the liquid 91 arranged between the object lens 54 and the object for measurement 2. Although the protective cover 92 may be contaminated or deteriorated, it may be optionally exchanged to permit measurement under an optimum condition at all times.

What is claimed is:

1. A measurement device comprising:
    ultraviolet laser light generating means for generating ultraviolet laser light by wavelength conversion of laser light from a solid-state laser light source; and
    measurement means for measuring the structure of an object for measurement by heterodyne detection or homodyne detection employing said ultraviolet laser light.

2. The measurement device according to claim 1 wherein said solid-state laser light source is oscillated in a single longitudinal mode.

3. The measurement device according to claim 1 wherein said solid-state laser light source is a diode laser pumped solid state laser pumped by a laser light from a semiconductor laser to radiate the laser light from the solid-state laser light source.

4. The measurement device according to claim 3 wherein said diode laser pumped solid state laser includes a monolithic ring type optical resonator and wherein the laser light from said semiconductor laser falls on the monolithic ring type optical resonator to excite the monolithic ring type optical resonator to radiate the laser light from the solid-state laser light source.

5. The measurement device according to claim 4 wherein said diode laser pumped solid state laser is configured so that the optical path in the monolithic ring type optical resonator is non-coplanar.

6. The measurement device according to claim 1 wherein said solid-state laser light source includes semiconductor laser and a wavelength selecting element and wherein the laser light from the semiconductor laser is radiated via the wavelength selecting element to radiate the laser light of a single frequency.

7. The measurement device according to claim 1 wherein said ultraviolet laser light generating means generates the ultraviolet laser light by wavelength conversion by multiple stages.

8. The measurement device according to claim 1 further comprising:
a nonlinear optical element, formed as a ring type resonator, for converting a wavelength of the laser light from the solid-state laser light source to a wavelength of the ultraviolet laser light; wherein
the laser light from the solid-state laser light source is resonant in said nonlinear optical element, said nonlinear optical element generating harmonics or the sum frequency to effect said wavelength conversion.

9. The measurement device according to claim 1 wherein said ultraviolet laser light generating means includes an optical resonator made up of multiple mirrors and a nonlinear optical element arranged in said optical resonator; and wherein
the laser light from the solid-state laser light source is resonant in said optical resonator, said nonlinear optical element generating harmonics or the sum frequency to effect said wavelength conversion.

10. The measurement device according to claim 9 further comprising:
position control means for controlling the position of the mirrors making up the optical resonator.

11. The measurement device according to claim 1 wherein said measurement means includes movement means for causing movement of the object for measurement and wherein
said movement means causes movement of the object for measurement so that a light spot of said ultraviolet laser light scans the object for measurement at the time of measuring the structure of the object for measurement.

12. The measurement device according to claim 1 wherein said measurement means includes deflection means for deflecting said ultraviolet laser light to control the proceeding direction of the ultraviolet laser light;
said deflection means causing deflection of said ultraviolet laser light so that the ultraviolet laser light will be incident on a pre-set position of the object for measurement at the time of measuring the structure of the object for measurement.

13. The measurement device according to claim 12 wherein said deflection means causes deflection of said ultraviolet laser light so that a light spot of said ultraviolet laser light will scan the object for measurement at the time of measurement of the object for measurement.

14. The measurement device according to claim 1 wherein said measurement means includes light splitting means for splitting said ultraviolet laser light into the detection light illuminated on the object for measurement and reference light for heterodyne or homodyne detection.

15. The measurement device according to claim 14 wherein said measurement means includes frequency shifting means for frequency shifting at least one of the detection light and the reference light.

16. The measurement device according to claim 15 wherein said frequency shifting means is an acousto-optical modulator.

17. The measurement device according to claim 14 wherein said measurement means includes phase shifting means for shifting the phase of at least one of the detection light or the reference light.

18. The measurement device according to claim 17 wherein said phase shifting means is an electro-optical phase modulator.

19. The measurement device according to claim 17 wherein said phase shifting means includes at least one of a mirror arranged on an optical path of the detection light and a mirror arranged on an optical path of the reference light and a mirror position controlling means for controlling the position of said mirror, said mirror position controlling means controlling the position of said mirror phase control means for shifting the phase of at least one of said detection light and said reference light.

20. The measurement device according to claim 14 wherein said light splitting means splits the ultraviolet laser light so that the power of said reference light will be larger than that of said detection light.

21. The measurement device according to claim 20 wherein said light splitting means splits the ultraviolet laser light so that the power of said reference light will be not less than 100 for the power 1 of the detection light.

22. The measurement device according to claim 20 wherein said light splitting means splits the ultraviolet laser light so that the power of the detection light illuminated on the object for measurement will be not larger than 1 $\mu$w.

23. The measurement device according to claim 14 wherein said measurement means includes a photodetector for receiving the return light reflected from the object for measurement and the reference light used for heterodyne or homodyne detection, said photodetector detecting a heterodyne signal or a homodyne signal produced on interference between said return light and the reference light.

24. The measurement device according to claim 23 wherein said photodetector is an Si-PIN photodiode, an Si-APD photodiode or a GaN photodiode.

25. The measurement device according to claim 14 wherein said measurement means forms multiple detection light spots on the object for measurement, the return light of said spots being detected by multiple photodetectors.

26. The measurement device according to claim 25 wherein said photodetectors are Si-PIN photodiodes, Si-APD photodiodes or GaN photodiodes.

27. The measurement device according to claim 1 wherein said measurement means includes an object lens of silica or fluorite as light converging means for converging the ultraviolet laser light on the object for measurement.

28. The measurement device according to claim 1 wherein said measurement means includes an object lens as light converging means for converging the ultraviolet laser light on the object for measurement and a protective cover for protecting the surface of said object lens.

29. The measurement device according to claim 1 further comprising:

two ultraviolet laser light generating means for generating a first ultraviolet laser light beam and a second ultraviolet laser light beam, the first and second ultraviolet laser light beams having different wavelengths, as said ultraviolet laser light generating means;

said measurement means illuminating the first ultraviolet laser light beam onto the object for measurement; said measurement means performing heterodyne detection by causing the second ultraviolet laser light beam to interfere with a return light of the first ultraviolet laser light beam reflected back from the object for measurement.

30. A measurement method comprising:

generating ultraviolet laser light by wavelength conversion of the laser light from a solid-state laser light source; and measuring the structure of an object for measurement by heterodyne detection or homodyne detection employing said ultraviolet laser light.

31. The measurement method according to claim 30 wherein at the time of heterodyne detection or homodyne detection, the ultraviolet laser light is converged by an object lens on an object for measurement and wherein liquid is arranged between the object lens and the object for measurement.

32. The measurement method according to claim 31 wherein liquid undergoing chemical reaction with the object for measurement is used as said liquid.

33. The measurement method according to claim 31 wherein an exchangeable protective cover is fitted on said object lens.

34. A measurement device comprising:

laser light generating means for generating laser light;

light splitting means for splitting the laser light from the laser light generating means into multiple light beams;

frequency shifting means for applying frequency shifting to the laser light so that the laser light beams split by said light splitting means will be of different frequencies;

imaging means for conducing the laser light beams frequency shifted by said frequency shifting means to an object for measurement and for imaging the respective laser light beams at different focal point positions; and measurement means for performing heterodyne detection using the respective laser light beams imaged at different focal point positions by said imaging means; said measurement means separating the heterodyne signals resulting from heterodyne detection into respective frequency bands for measuring the structure of the object for measurement in association with respective imaging points.

35. The measurement device according to claim 34 wherein said light splitting means splits the laser light from the laser light generating means into multiple light beams having different optical axes; and wherein said frequency shifting means applies frequency shifting to each of the light beams split by said light splitting means.

36. The measurement device according to claim 35 wherein said light splitting means is an optical block the opposite surfaces of which are mirror surfaces;

the laser light incident on the light splitting means being repeatedly reflected between said opposite mirror surfaces of the optical block, the laser light being split each time it is reflected by one of said mirror surfaces into the light transmitted through said mirror surface and the light reflected by said mirror surface.

37. The measurement device according to claim 36 wherein the laser light repeatedly reflected between the two mirror surfaces of the optical block is the divergent light.

38. The measurement device according to claim 34 wherein said light splitting means is a first mirror and a second mirror arranged facing said first mirror and adapted for transmitting a portion of the incident light therethrough;

said frequency shifting means is a frequency shifter arranged between the first and second mirrors;

the laser light incident on said light splitting means being repeatedly reflected between said first and second mirrors, said laser light being split each time it is reflected by one of said mirrors into the light transmitted through said mirror and the light reflected by said mirror, said laser light being frequency shifted by a frequency shifter each time it is reflected between said first and second mirrors.

39. The measurement device according to claim 38 wherein the laser light repeatedly reflected between said first and second mirrors is the divergent light.

40. A measurement method comprising:

splitting the laser light into multiple laser light beams and frequency shifting the laser light so that the multiple split laser light beams will be of different frequencies;

conducting the frequency shifted laser light beams to an object for measurement and imaging the respective laser light beams at different focal point positions;

performing heterodyne detection using the laser light beams imaged at the different focal point positions; and separating the heterodyne signals obtained by said heterodyne detection into respective frequency bands and measuring the structure of the object for measurement associated with the respective imaging points.

41. The measurement method according to claim 40 wherein at the time of heterodyne detection, the frequency shifted respective laser light beams are converged and imaged by an object lens; and wherein liquid is arranged between the object lens and the object for measurement.

42. The measurement method according to claim 41 wherein liquid undergoing chemical reaction with the object for measurement is used as said liquid.

43. The measurement method according to claim 41 wherein an exchangeable protective cover is fitted on said object lens.

* * * * *